United States Patent
Onoe et al.

(10) Patent No.: US 8,634,658 B2
(45) Date of Patent: Jan. 21, 2014

(54) APPARATUS, METHOD, AND PROGRAM FOR PROCESSING IMAGE

(75) Inventors: Naoyuki Onoe, Kanagawa (JP); Junichi Yamashita, Saitama (JP); Daisuke Mochizuki, Chiba (JP); Naoki Kobayashi, Tokyo (JP); Akihiko Kaino, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 12/829,870

(22) Filed: Jul. 2, 2010

(65) Prior Publication Data

US 2011/0052081 A1    Mar. 3, 2011

(30) Foreign Application Priority Data

Aug. 31, 2009   (JP) ................................. 2009-201028
Dec. 16, 2009   (JP) ................................. 2009-284807

(51) Int. Cl.
*G06K 9/64* (2006.01)
(52) U.S. Cl.
USPC ........................................................ 382/217
(58) Field of Classification Search
USPC ........................................ 382/209, 217, 224
See application file for complete search history.

(56) References Cited

U.S. PATENT DOCUMENTS

| | | | | |
|---|---|---|---|---|
| 6,332,123 | B1 * | 12/2001 | Kaneko et al. ................. | 704/276 |
| 7,123,262 | B2 * | 10/2006 | Francini et al. ............... | 345/473 |
| 7,257,239 | B2 * | 8/2007 | Rowe et al. .................... | 382/118 |
| 7,433,490 | B2 * | 10/2008 | Huang et al. .................. | 382/100 |
| 7,526,193 | B2 * | 4/2009 | Minato et al. ................. | 396/123 |
| 7,634,106 | B2 * | 12/2009 | Mino et al. .................... | 382/103 |
| 7,711,155 | B1 * | 5/2010 | Sharma et al. ................ | 382/118 |
| 7,889,886 | B2 * | 2/2011 | Matsugu et al. .............. | 382/103 |
| 2003/0007700 | A1 * | 1/2003 | Gutta et al. .................... | 382/282 |
| 2009/0309878 | A1 * | 12/2009 | Otani et al. ................... | 345/427 |

FOREIGN PATENT DOCUMENTS

| | | |
|---|---|---|
| JP | 7-44727 | 2/1995 |
| JP | 2002-232783 | 8/2002 |
| JP | 2005-157679 | 6/2005 |
| JP | 2005-284348 | 10/2005 |
| JP | 2007-156650 | 6/2007 |

OTHER PUBLICATIONS (Lyons, Michael; "Avatar Creation using Automatic Face recogntion"; Sep. 1998; ACM Multimedia 98, Bristol, England).*

(Continued)

*Primary Examiner* — Samir Ahmed
*Assistant Examiner* — Totam Le
(74) *Attorney, Agent, or Firm* — Oblon, Spivak, McClelland, Maier & Neustadt, L.L.P.

(57) ABSTRACT

An image processing apparatus includes a face detector for detecting a face region from an image including a face of a user, a part detector for detecting a positional layout of a part of the face included in the face region detected by the face detector, a determiner for determining an attribute of the face on the basis of the positional layout of the part detected by the part detector and calculating a score indicating attribute determination results, a model selector for selecting, on the basis of the score calculated by the determiner, a model that is to be displayed in place of the face of the user in the image, and an image generator for generating an image of a face of the model selected by the model selector and synthesizing the image of the face of the model with the face of the user within the face region.

10 Claims, 25 Drawing Sheets

(56) References Cited

OTHER PUBLICATIONS (Fu, Yun; "Age Synthesis and Estimation via Faces: A survey"; Novemeber 2010; IEEE Transactions on Pattern Analysis and Machine Intelligence; vol. 32).*

(Wang, Haibo; "An Online Face Avatar under Natural Head Movement"; LIFL & Inria Futurs,University of Lille, France).*

(Odagiri, Koshi; "Lip reading:Japanese vowel recognition by tracking temporal changes of lip shape"; Waseda university, Tokyo, Japan).*

(Andrew Chou, "Face Detection, Extraction and Swapping on Mobile Devices", 2011, Standford.edu).*

(Dmitri Bitouk, "Face Swapping: Automatically Replacing Faces in Photographs", 2008, http://www.cs.columbia.edu).*

* cited by examiner

FIG. 6
| | FACE DETECTION RESULT INFORMATION | FACE POSITION INFORMATION |
|---|---|---|
| Roll | DETECTION RANGE: ABOUT ±20 DEGREES | DETECTION RANGE: ABOUT ±35 DEGREES |
| Pitch | NOT DETECTING | DETECTION RANGE: ABOUT ±20 DEGREES |
| Yaw | DETECTION RANGE: ABOUT ±35 DEGREES | DETECTION RANGE: ABOUT ±40 DEGREES |
| COORDINATE SYSTEM | RIGHT-HAND COORDINATE SYSTEM 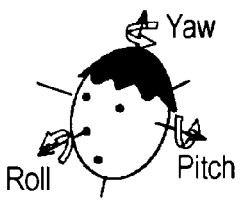 | LEFT-HAND COORDINATE SYSTEM 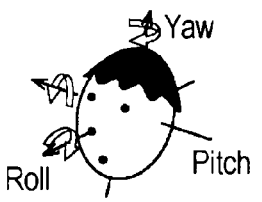 |

FIG. 8A
| | FACE ORIENTATION CORRECTION PROCESS | IMAGE GENERATION PROCESS |
|---|---|---|
| COORDINATE SYSTEM | RIGHT-HAND COORDINATE SYSTEM 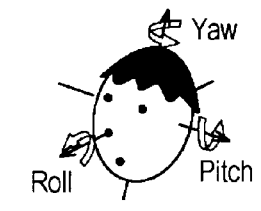 | LEFT-HAND COORDINATE SYSTEM 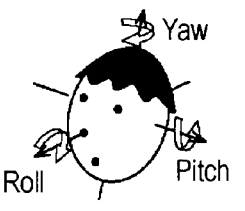 |
FIG. 8B
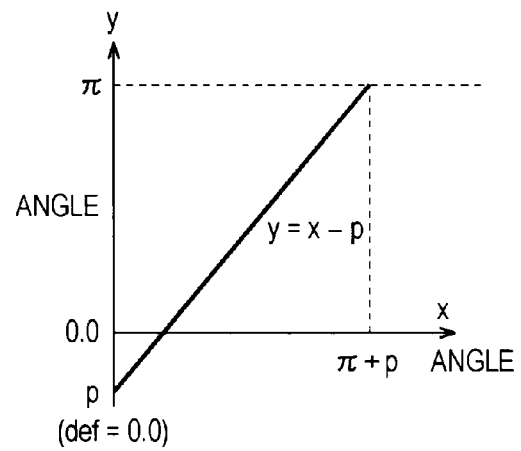
FIG. 8C
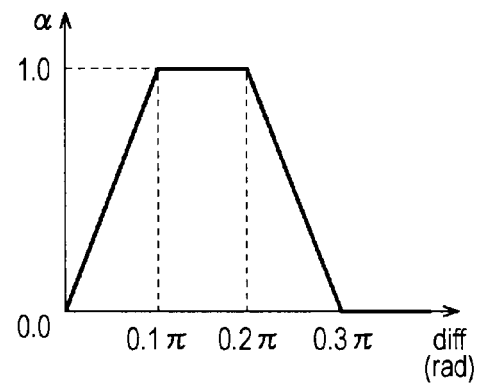

FIG. 13

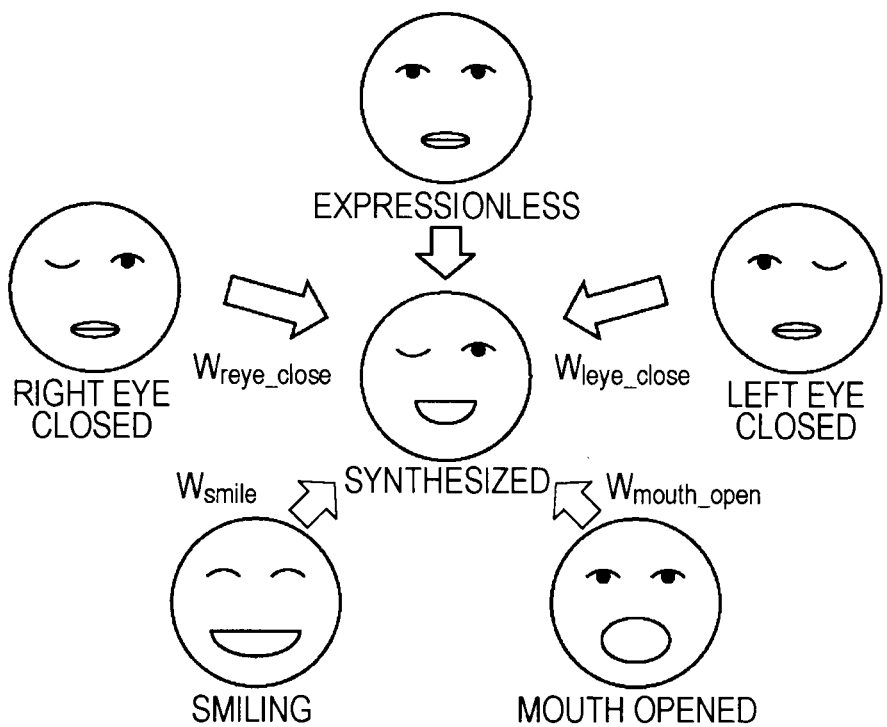

MORPHING AT EACH APEX $P_{synth}(x,y,z) =$
$\quad P_{reye\_close}(x,y,z) \times W_{reye\_close}$
$\quad + P_{leye\_close}(x,y,z) \times W_{leye\_close}$
$\quad + P_{mouth\_open}(x,y,z) \times W_{mouth\_open}$
$\quad + P_{smile}(x,y,z) \times W_{smile}$
$\quad + P_{normal}(x,y,z)$
$\quad \times (1 - W_{reye\_close} - W_{leye\_close} - W_{mouth\_open} - W_{smile})$ $W_{reye\_close}, W_{leye\_close}, W_{mouth\_open}, W_{smile}$
: WEIGHT COEFFICIENT WITHIN RANGE FROM 0 TO 1.0

FIG. 17

| TYPE | PARAMETERS | BLOCK IN USE |
|---|---|---|
| EMOTIONAL PARAMETERS | SMILING | ATTRIBUTE DETECTOR (SMILING FACE) |
| | SADNESS | ATTRIBUTE DETECTOR (SADNESS) |
| | ANGER | ATTRIBUTE DETECTOR (ANGER) |
| PART PARAMETERS | BLINKING | PART DETAIL DETECTOR |
| | EYEBROW | PART DETAIL DETECTOR |
| | EYEBALL | PART DETAIL DETECTOR |
| | MOUTH CLOSING/OPENING | PART DETAIL DETECTOR |
| VISEME PARAMETERS | VISEME /a/ | VOWEL VISEME DETERMINER |
| | VISEME /i/ | VOWEL VISEME DETERMINER |
| | VISEME /u/ | VOWEL VISEME DETERMINER |
| | VISEME /e/ | VOWEL VISEME DETERMINER |
| | VISEME /o/ | VOWEL VISEME DETERMINER |
| | VISEME /n/ | VOWEL VISEME DETERMINER |

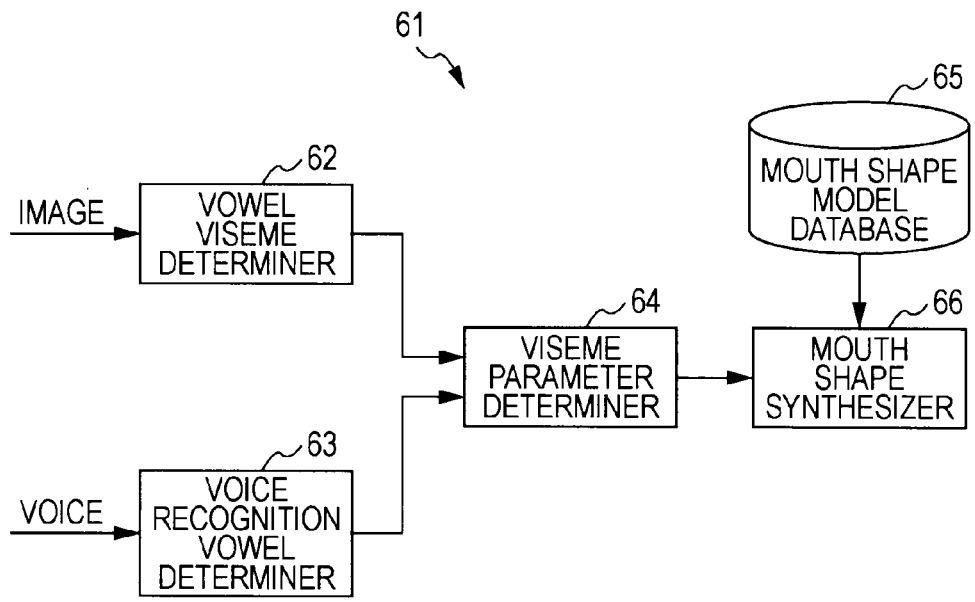

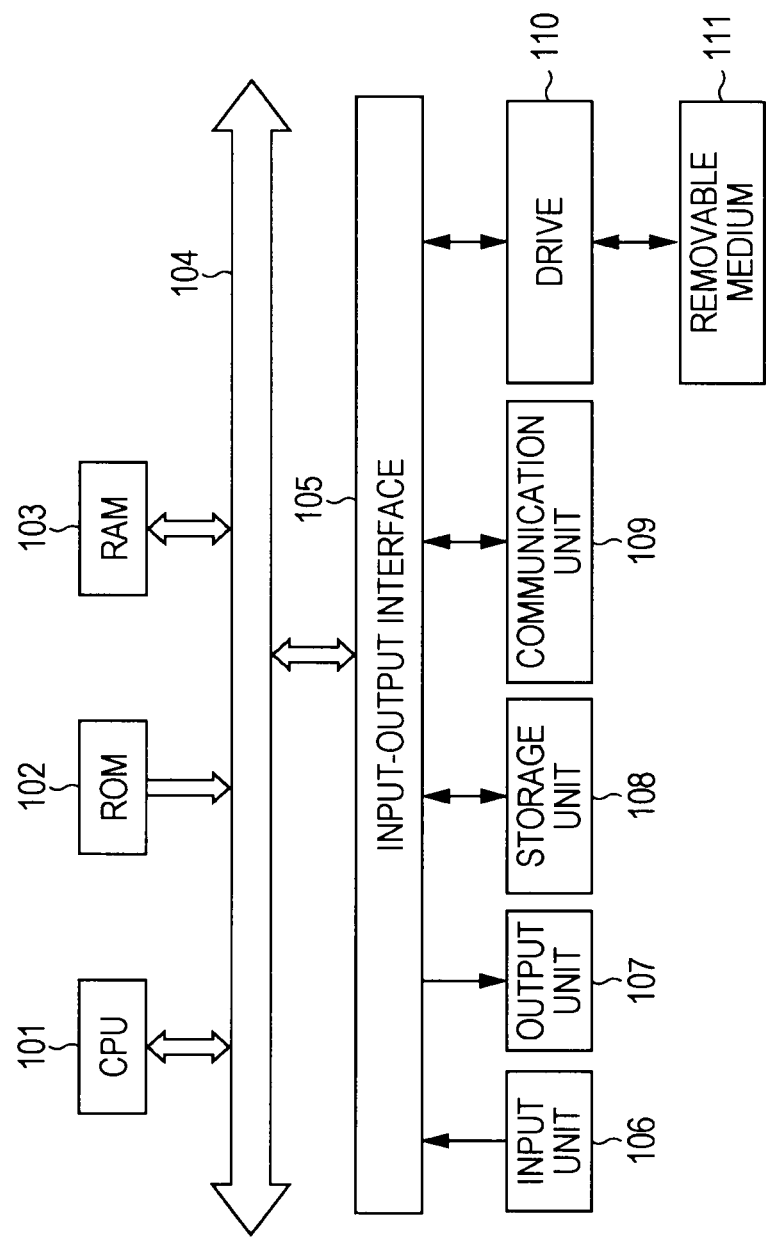

APPARATUS, METHOD, AND PROGRAM FOR PROCESSING IMAGE

BACKGROUND OF THE INVENTION

1. Field of the Invention

The present invention relates to an image processing apparatus, an image processing method and an image processing program and, in particular, an image processing apparatus, an image processing method and an image processing program for presenting an image to which a user is more amenable to.

2. Description of the Related Art

A typical one of the related-art image processing apparatuses detects a face of a user in an image on a real-time basis, and replaces partly or entirely the image of the face with another image in synchronization with the detected face of the user.

For example, Japanese Unexamined Patent Application Publication No. 2005-157679 discloses a technique of detecting a face image of any size at a high discrimination performance. Japanese Unexamined Patent Application Publication No. 2005-284348 discloses a technique of detecting fast a face image. Japanese Unexamined Patent Application Publication No. 2002-232783 discloses a technique of gluing images of a face of a user pre-captured in a plurality of directions in accordance with an orientation of a face image detected from an image.

A face image pre-captured in this way and a face image detected from an image may be replaced with an avatar produced through computer graphics. By detecting a change in a facial expression of a user on a real-time basis, the expression of the replacing avatar may be synchronized with the change in the facial expression of the user. For example, the openness of the eyes of the avatar or the openness of the mouth of the avatar may be varied in accordance with the facial expression of the user. The smiling degree of the avatar may be varied in accordance with the smiling degree of the user.

Japanese Unexamined Patent Application Publication No. 2007-156650 discloses a technique of generating a natural expression of a face. Japanese Unexamined Patent Application Publication No. 7-44727 discloses a technique of varying a mouth shape in synchronization with a voice.

SUMMARY OF THE INVENTION

The user may be amenable to an image (such as in a game or a virtual space) by replacing a face of a user in an image with an avatar. The user desirably empathizes with the image.

It is thus desirable to provide an image to which the user is more amenable.

In one embodiment of the present invention, an image processing apparatus includes face detector means for detecting a face region from an image including a face of a user, part detector means for detecting a positional layout of a part of the face included in the face region detected by the face detector means, determiner means for determining an attribute of the face on the basis of the positional layout of the part detected by the part detector means and calculating a score indicating attribute determination results, model selector means for selecting, on the basis of the score calculated by the determiner means, a model that is to be displayed in place of the face of the user in the image, and image generator means for generating an image of a face of the model selected by the model selector means and synthesizing the image of the face of the model with the face of the user within the face region.

In another embodiment of the present invention, one of an image processing method and an image processing program includes the steps of detecting a face region from an image including a face of a user, detecting a positional layout of a part of the face included in the face region, determining an attribute of the face on the basis of the positional layout of the part and calculating a score indicating attribute determination results, selecting, on the basis of the score, a model that is to be displayed in place of the face of the user in the image, and generating an image of a face of the selected model and synthesizing the image of the face of the model with the face of the user within the face region.

In yet another embodiment of the present invention, a face region is detected from an image including a face of a user, a positional layout of a part of the face included in the face region is detected, an attribute of the face is determined on the basis of the positional layout of the part, and a score indicating attribute determination results is calculated. A model that is to be displayed in place of the face of the user in the image is selected on the basis of the score. An image of a face of the selected model is generated and the image of the face of the model is synthesized with the face of the user within the face region.

In still another embodiment of the present invention, an image to which the user is amenable is thus provided.

BRIEF DESCRIPTION OF THE DRAWINGS

FIG. 6 illustrates an angle rotation of a face region included in the face detection result information and a posture of a face region included in the face position information;

FIGS. 8A-8C illustrate parameters indicating a face orientation of an avatar;

FIG. 13 illustrates an expression synthesis;

FIG. 17 illustrates parameters for use in the expression synthesis;

FIG. 19 is a block diagram of a mouth shape synthesizer;

FIG. 20 illustrates an example of parameters;

FIG. 26 is a block diagram illustrating a computer in accordance with one embodiment of the present invention.

DESCRIPTION OF THE PREFERRED EMBODIMENTS

The embodiments of the present invention are described in detail below with reference to the drawings.

Figure 1:
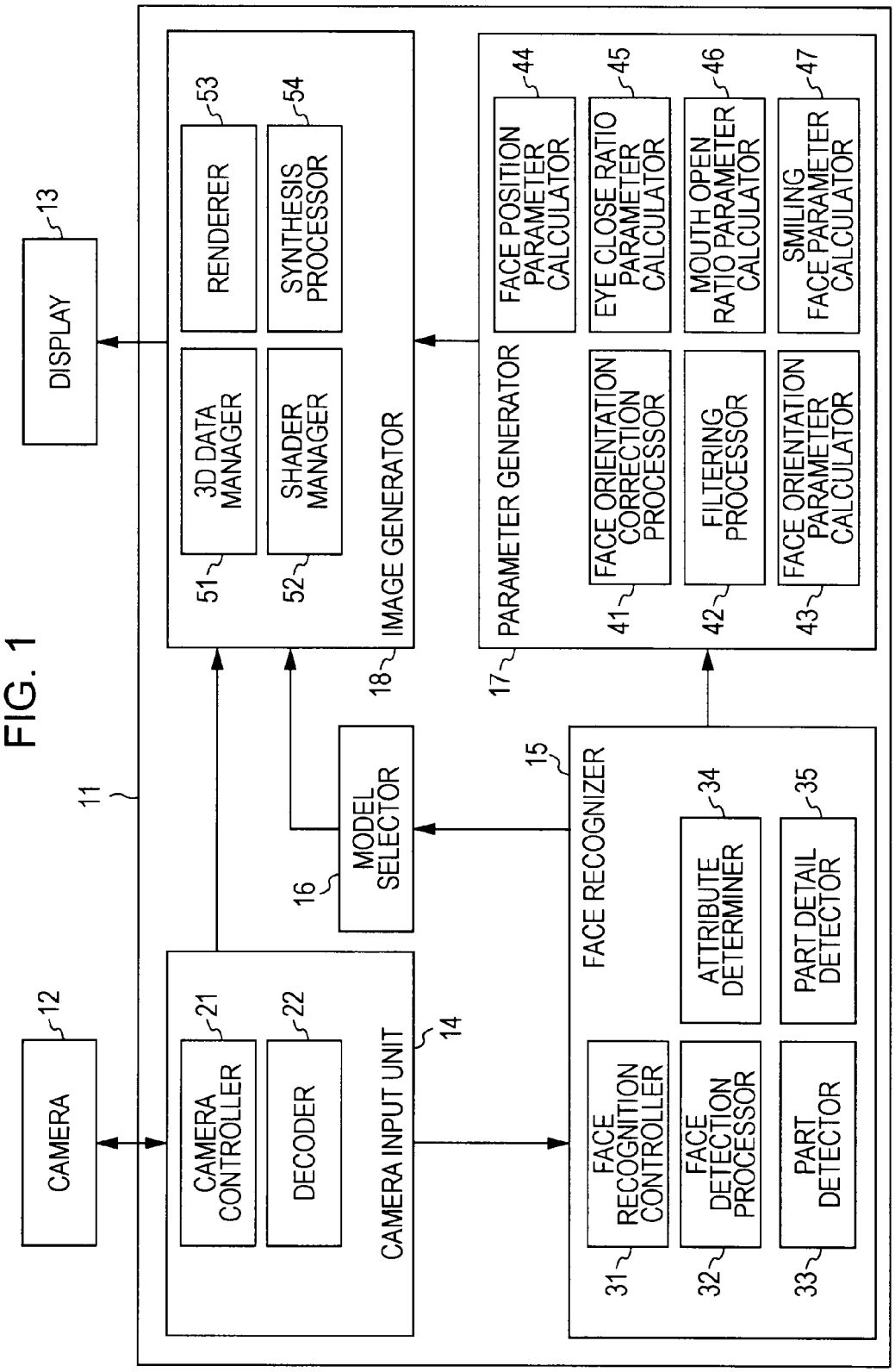
FIG. 1 is a block diagram of an image processing apparatus in accordance with one embodiment of the present invention.

FIG. 1 is a block diagram of an image processing apparatus of one embodiment of the present invention.

Referring to FIG. 1, an image processing apparatus 11 connects to a camera 12 and a display 13.

The camera 12 includes an imaging device such as a charge coupled device (CCD) or a complementary metal oxide semiconductor (CMOS) sensor, and an imaging optical system including a plurality of lenses. The camera 12 supplies an image captured by the imaging device to the image processing apparatus 11 via the imaging optical system.

The display 13 includes a display device such as a cathode ray tube (CRT), a liquid-crystal display (LCD), a plasma display panel (PDP), or an organic electroluminescence (EL) panel. The display 13 is supplied with an image processed by the image processing apparatus 11, and then displays the image.

The image processing apparatus 11 performs an image processing process to synthesize the face of an avatar, generated through computer graphics, in a region where the face of a user is displayed in an image captured by the camera 12. The avatar refers to a character displayed as a picture representing a person in a virtual space for game playing and chatting. In accordance with the present embodiment, the face of a character generated through computer graphics and displayed in place of the face of a user is hereinafter referred to as an avatar.

Figure 2A:
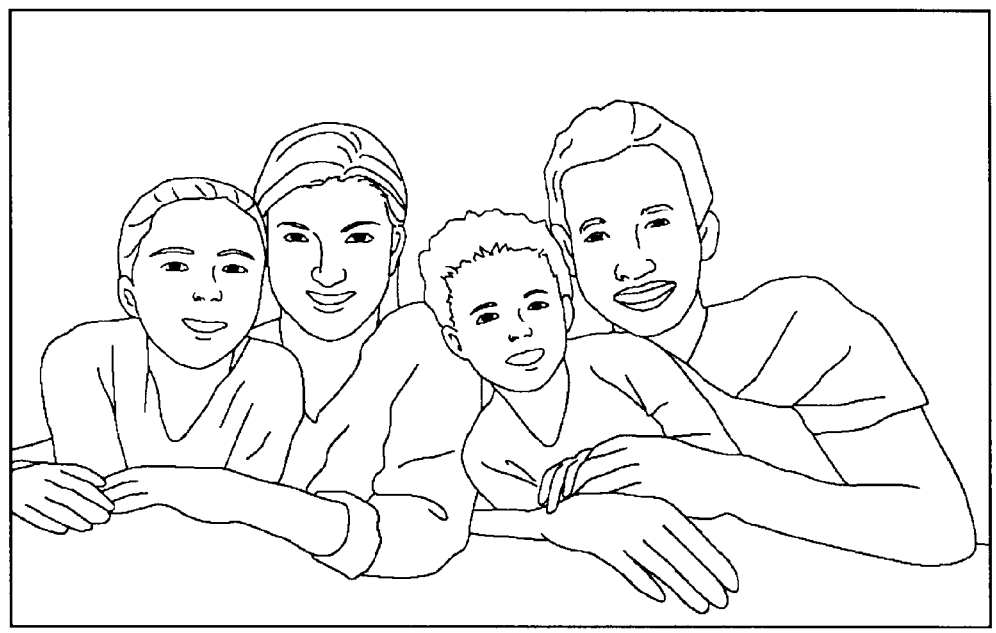
FIGS. 2A and 2B illustrate an image processing process of the image processing apparatus.
Figure 2B:
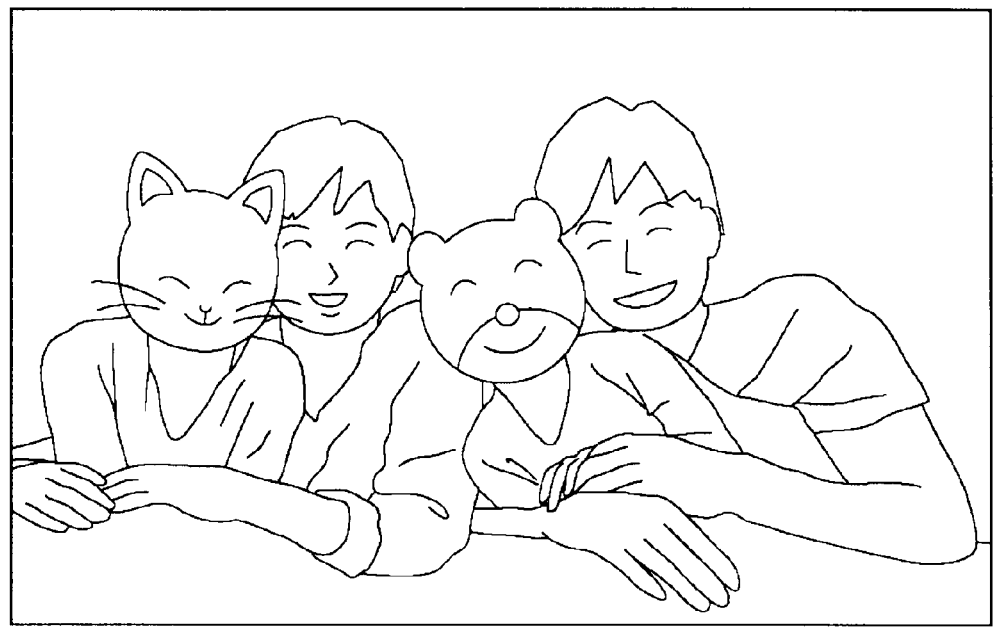

Referring to FIGS. 2A and 2B, an image processing process of the image processing apparatus 11 is generally described. FIG. 2A illustrates an image captured by the camera 12 and then input to the image processing apparatus 11. FIG. 2B illustrates an image processed by the image processing apparatus 11 and then displayed on the display 13.

The image processing apparatus 11 detects the face of the user presented in the input image, and determines based on an attribute (feature) extracted from the face image whether the face is of an adult, or a child, and a male, or a female. The image processing apparatus 11 generates an avatar based on determination results, and generates an output image by synthesizing the avatar with the input image such that the avatar is overlaid at the position of the face of the user. An output image having an avatar corresponding to a male adult replacing the face of the male adult presented in the input image is thus displayed. An output image having an avatar corresponding to a female adult replacing the face of the female adult presented in the input image is thus displayed. Referring to FIG. 2B, the faces of children presented in the input image are replaced with animal characters as avatars corresponding to the children.

The image processing apparatus 11 performs, on a real-time basis, an image processing process on a moving image captured by the camera 12. If the expression changes on the user's face, the expression of the avatar can also be changed in synchronization.

As illustrated in FIG. 1, the image processing apparatus 11 includes a camera input unit 14, a face recognizer 15, a model selector 16, a parameter generator 17, and an image generator 18.

The camera input unit 14 includes a camera controller 21 and a decoder 22. When an image captured by the camera 12 is input to the camera input unit 14, the camera controller 21 adjusts exposure and white balance to the camera 12 in response to the image from the camera 12.

An image input to the camera input unit 14 from the camera 12 is raw data (not image processed data when output from the imaging device). The decoder 22 converts the image of the raw data into an image of RGB+Y data (data representing an image of the three primary colors of red, green, and blue, and a luminance signal Y), and then supplies the image to the face recognizer 15.

The face recognizer 15 includes a face recognition controller 31, a face detection processor 32, a part detector 33, an attribute determiner 34, and a part detail detector 35. The face recognizer 15 performs a face recognition process on an image supplied from the decoder 22 in the camera input unit 14.

The face recognition controller 31 performs a control process on each element in the face recognizer 15. For example, the face recognition controller 31 performs the control process to cause the output of the attribute determiner 34 to be supplied to the model selector 16 throughout a predetermined number of frames (15 frames, for example) starting with a frame from which a new face is detected, and then to be supplied to the parameter generator 17 after the predetermined number of frames.

The face detection processor 32 receives an image output from the camera input unit 14 and performs a face detection process to detect from the image a region including the face of the user (hereinafter referred to as a face region). For example, the face detection processor 32 performs the face detection process in two phases of a general search and a local search. In the general search, the face detection processor 32 handles the entire image, thereby searching for a face region of each face presented in the image. In the local search, the face detection processor 32 performs a local search operation, focusing on a face region previously detected in the general search. The face detection processor 32 detects faces (targets) of a plurality of users in the general search while tracking in the local search each face detected in the general search.

If the face of the user is presented in the image from the camera input unit 14, the face detection processor 32 outputs face detection result information identifying the face region of the face. If a new face, not presented previously in the image, is detected in the general search, the face detection processor 32 starts outputting the face detection result information of the new face. While the face is continuously presented in the image, the face detection processor 32 tracks the face in the local search, and continuously outputs the face detection result information of the face. The face detection result information includes a reference point, a horizontal width, a vertical length, and a rotation angle (faceX, faceY, faceW, faceH, faceRoll, and faceYaw) of the face region.

Figure 3:
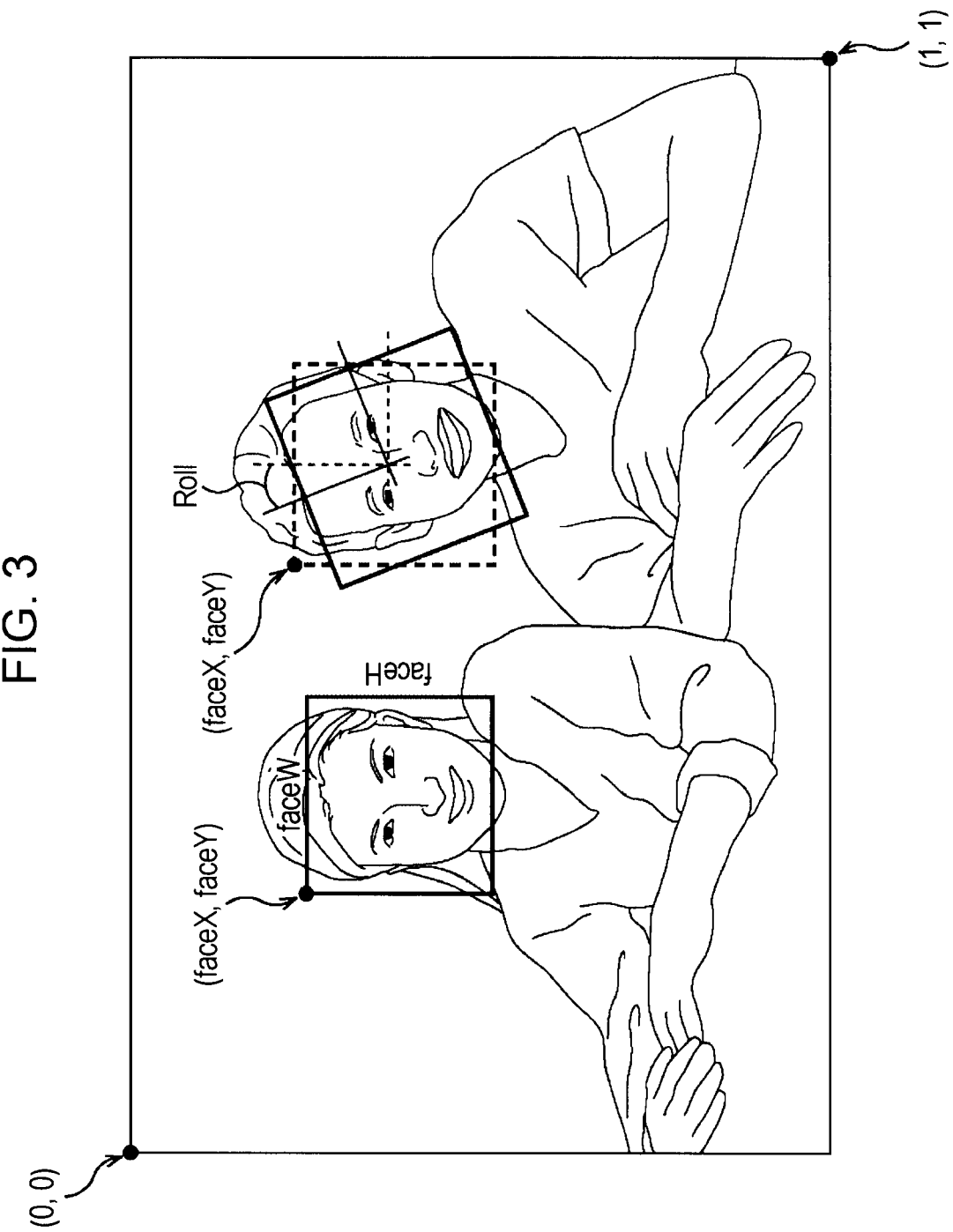
FIG. 3 illustrates face detection result information.

The face detection result information is described below with reference to FIG. 3. As illustrated in FIG. 3, the reference point (faceX, faceY) of the face region is normalized with (0, 0) as the top left corner of the entire image and (1, 1) as the bottom right corner of the entire image, and then represented in XY coordinates of the top left corner of the face region. As the reference point of the face region, the horizontal width and the vertical length (faceW, faceH) of the face region are represented by values that are normalized with a side of the face region, in parallel with a line connecting the two eyes, serving as a horizontal line and a side of the face region, in perpendicular to the horizontal line, serving as a vertical line. The rotation angles of the face region (faceRoll, faceYaw) are represented in the right-hand coordinate system to be discussed later in FIG. 6.

The part detector 33 (FIG. 1) detects as parts of the face of the user the right eye, the left eye, the nose, and the mouth of the face in the face region detected by the face detection processor 32, and outputs part information as information indicating coordinates of the center point of each part. In the part information, coordinates representing the center point of each of the right eye, the left eye, the nose, and the mouth are normalized with (0,0) representing the reference point (faceX, faceY) as the top left corner of the face region and (1,1) representing the bottom right corner of the face region.

The part detector 33 determines a position and a posture of the face based on a geometry relationship of the detected parts, and outputs face position information indicating the position and the posture of the face. The face position information includes coordinates of the four corners of the face region, and the posture of the face (regionX[0]-[3], regionY[0]-[3], PoseRoll, PosePitch, PoseYaw).

Figure 4:
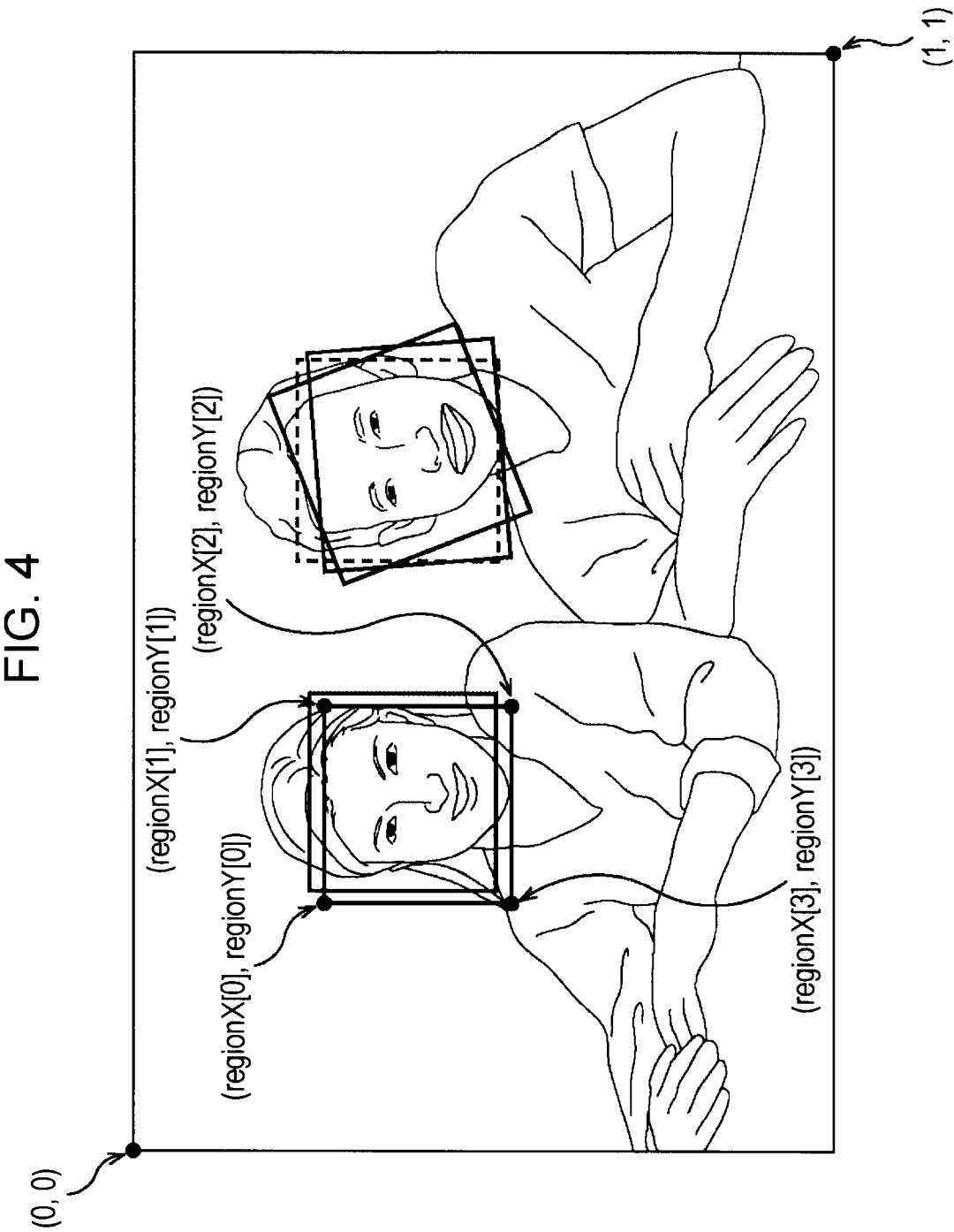
FIG. 4 illustrates face position information.

The face position information is described below with reference to FIG. 4. As illustrated in FIG. 4, the coordinates of the four corners of the face region (regionX[0]-[3], and regionY[0]-[3]) are represented by the values that are normalized with (0,0) representing the top left corner of the entire image and (1,1) representing the bottom right corner of the entire image. The posture of the face region (PoseRoll, PosePitch, PoseYaw) is represented in the left-hand coordinate system as illustrated in FIG. 6.

The attribute determiner 34 (FIG. 1) determines the attribute of the face presented in the image based on the part information output by the part detector 33, and outputs attribute information related to the attribute of the face. The attribute information includes a smile score (smile), a right eye open score (R eye Open), a left eye open score (L eye Open), a male score (Male), an adult score (Adult), a baby score (Baby), an elder score (Elder), and a glass score (Glasses).

The smile score represents the degree of smile of the face of the user, the right eye open score represents the degree of the right eye opening, and the left eye open score represents the degree of the left eye opening. The male score is a numerical value representing the degree of male of the face of the user. The adult score represents the adultness of the face of the user, and the baby score represents the degree of baby-likeness of the face of the user. The elder score represents the degree of elderliness of the face of the user, and the glass score represents the degree at which the user wears glasses. The attribute determiner 34 determines beforehand data for score calculation through learning based on the position of each part of the face of the user, and stores the data. Referencing the data, the attribute determiner 34 determines each score from the face of the user.

The part detail detector 35 detects points identifying each part in detail, such as a position and a shape of each part of the face presented in the image (outline, eyebrows, eyes, nose, mouth, etc.). The part detail detector 35 then outputs part result information indicating the points.

The part result information is described with reference to FIGS. 5A and 5B. The part detail detector 35 may perform a standard process to detect the points of each part from the entire face, and a light-workload process to detect the points as an outline of the mouth.

Figure 5A:
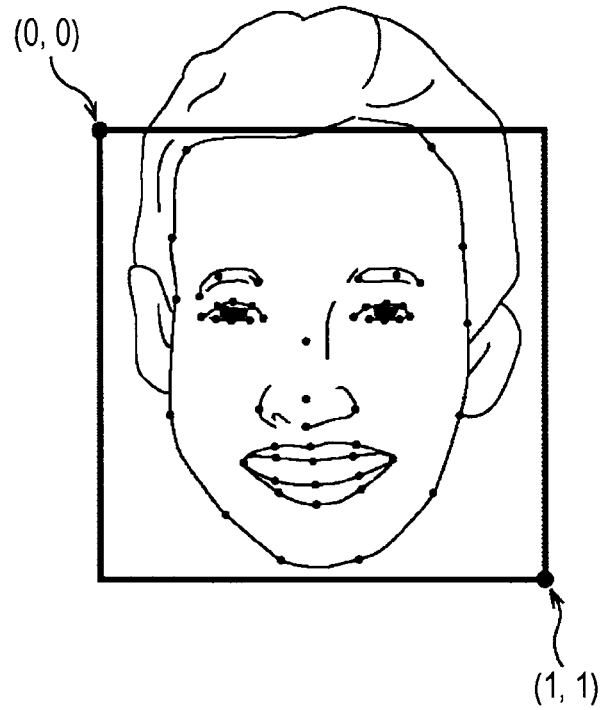
FIGS. 5A and 5B illustrate part result information.
Figure 5B:
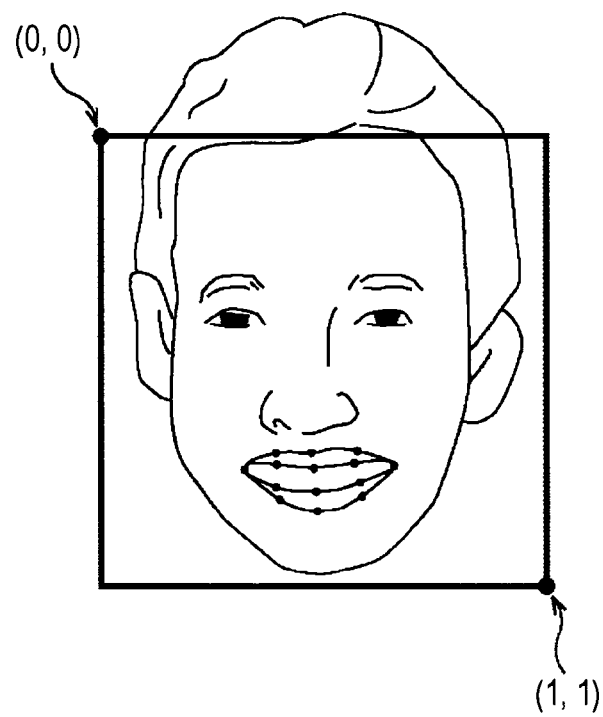

In the standard process, the part detail detector 35 detects 55 points identifying the outline of the face, the shape of the eyebrows, the outlines of the eyes, the shape of the nose, and the outline of the mouth as illustrated in FIG. 5A. In the light-workload process, the part detail detector 35 detects 14 points identifying the outline of the mouth as illustrated in FIG. 5B. The XY coordinates of each point are represented by values that are normalized with (0,0) as the coordinates of the top left corner of the face region and (1,1) as the coordinates of the bottom right corner of the face region. In the part result information, parts ID (partsID[0]-[55]) identifying each point is mapped to the XY coordinates (partsX, partsY) of the corresponding point.

The user may incline his or her face, causing the points of each part of the face to be rotated (shifted) with respect to the entire image. The XY coordinates of each point are represented by values that are normalized in the face region. The positions of each point remain unchanged relative to the top left corner (origin) of the face region. The coordinate axis of each point is rotated in response to the inclination of the face region. If the position of each point with respect to the entire image is determined, a correction operation to incline the face in an opposite direction to the inclination of the face region is to be performed.

The model selector 16 (FIG. 1) receives the male score and the adult score out of the attribute information output by the attribute determiner 34 under the control of the face recognition controller 31. The face recognition controller 31 performs the control process to cause the male score and the adult score output by the attribute determiner 34 to be supplied to the model selector 16 throughout a predetermined number of frames (15 frames, for example) starting with a frame from which the face detection processor 32 detects a new face.

The model selector 16 determines whether the face of the user in the image is of a male, a female, or a child, on the basis of the male score and the adult score supplied by the attribute determiner 34. The model selector 16 selects one of a male model, a female model, and a child model as three-dimensional (3D) data that is used when the image generator 18 generates an image of an avatar. The model selector 16 then supplies the image generator 18 with model information indicating selection results. A process of the model selector 16 is described later with reference to a flowchart of FIG. 15.

The parameter generator 17 includes a face orientation correction processor 41, a filtering processor 42, a face orientation parameter calculator 43, a face position parameter calculator 44, an eye close ratio parameter calculator 45, a mouth open ratio parameter calculator 46, and a smiling face parameter calculator 47. The parameter generator 17 generates a variety of parameters serving as control data when the image generator 18 generates an avatar.

The face orientation correction processor 41 receives an rotation angle of the face region (faceRoll, faceYaw) included in the face detection result information output by the face detection processor 32, and a posture (PoseRoll, PosePitch, PoseYaw) of the face region included in the face position information output by the part detector 33.

Referring to FIG. 6, a detection range of a rotation angle of the face region included in the face detection result information is set, and a detection range of the posture of the face region included in the face position information is set. The face detection result information is represented in the right-hand coordinate system, and the face position information is represented in the left-hand coordinate system. In the face detection result information, the face detection processor 32 is set to have about ±20 degrees as a detection range of a rolling motion of the face. No detection is performed in a pitching motion of the face. The face detection processor 32 is set to have about ±35 degrees as a detection range of a yawing motion of the face. In the face position information, the part detail detector 35 is set to have about ±35 degrees as a detection range of a rolling motion of the face, about ±20 degrees as a detection range of a pitching motion of the face, and about ±40 degrees as a detection range of a yawing motion of the face.

The use of only the posture of the face region seems sufficient in order to control the face angle of the avatar generated by the image generator 18. In the border of the detection range of the posture of the face region, noise varying (fluctuating) the value of detection may be caused at irregular intervals. If noise is caused in the value of the detection results, the avatar can tremble even if the face of the user remains stationary.

If the orientation of the user face is in the vicinity of the border of the detection range of the posture of the face region, the face orientation correction processor 41 performs a correction process to correct the face orientation to be output, based on time variations of the posture of the face region and time variations of the rotation angle of the face region.

More specifically, the rotation angle of the face region is unsusceptible to time variations (stable) in the vicinity of the border of the detection range while the posture of the face region sharply varies with time due to a noise component in the vicinity of the border of the detection range. When the posture of the face region varies sharply with time with the rotation angle of the face region remaining stable, the face orientation correction processor 41 outputs the detection results of the posture of the face region at one-frame earlier frame in order to control the outputting of the noise component. The face orientation correction processor 41 then outputs the thus corrected face angle of the user.

The filtering processor 42 (FIG. 1) performs a filtering process on parameters output from the parameter calculators in the parameter generator 17 (the face orientation parameter calculator 43, the face position parameter calculator 44, the eye close ratio parameter calculator 45, the mouth open ratio parameter calculator 46, and the smiling face parameter calculator 47) in order to stabilize the parameters.

The filtering process of the filtering processor 42 is described below with reference to FIGS. 7A and 7B.

Figure 7A:
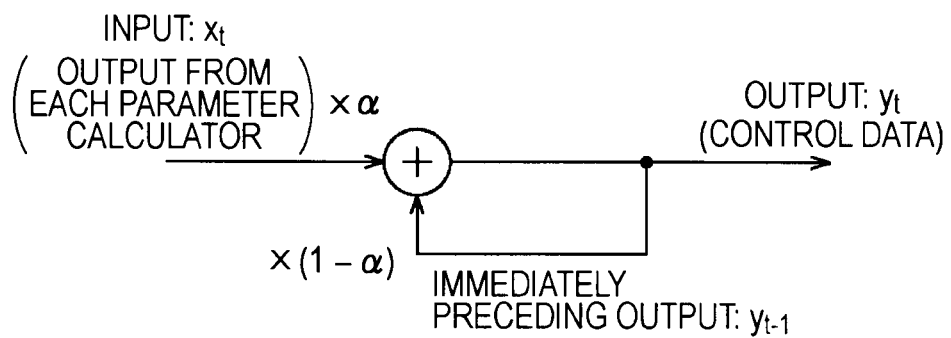
FIGS. 7A and 7B illustrate a filtering process of a filtering processor.

The filtering processor 42 is constructed as illustrated in a block diagram of FIG. 7A. The filtering processor 42 receives a parameter $x_t$ output from each parameter calculator and outputs a parameter $y_t$. The parameter $y_t$ serves as control data when the image generator 18 generates the avatar. The filtering processor 42 calculates the following equation (1):

$$y_t = \alpha x_t + (1-\alpha)xy_{t-1} \quad (1)$$

In equation (1), $\alpha$ represents an addition ratio between a parameter $x_t$ and a parameter $y_{t-1}$, and the parameter $y_{t-1}$ is an immediately preceding parameter output by the filtering processor 42.

Figure 7B:
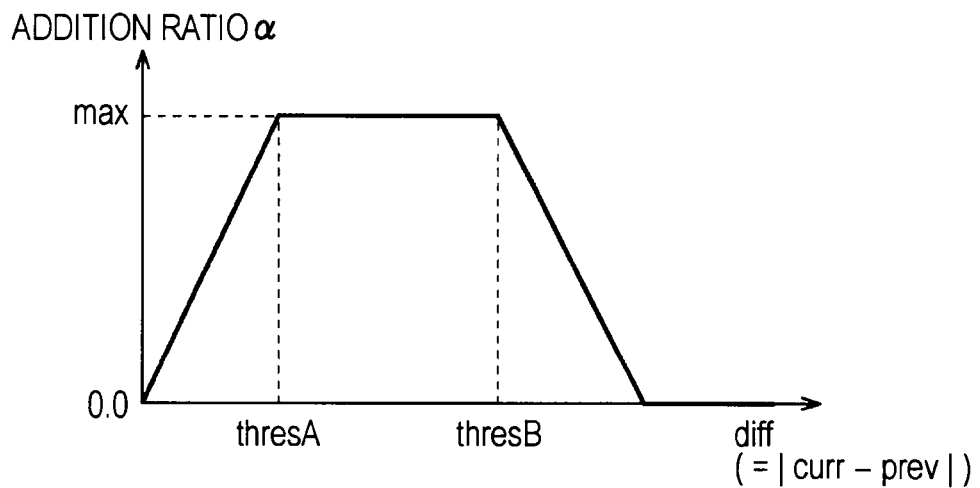

The addition ratio $\alpha$ is calculated from a variable diff (=|curr−prev|), which is the absolute value of a difference between a current input value and an immediately preceding input value, in accordance with a function represented by a maximum value max, and two threshold values thresA and thresB as illustrated in FIG. 7B. The function determining the addition ratio $\alpha$ increases at a constant gradient within the variable diff from zero to the threshold value thresA, and flattens out at the maximum value max within the variable diff from the threshold value thresA to the threshold value thresB, and decreases from the threshold value thresB at a constant gradient reverse to the gradient within the variable diff from zero to the threshold value thresA. If the threshold value thresA and the threshold value thresB are equal to each other, the function determining the addition ratio $\alpha$ has a mountain shape as will be described later.

The maximum value max, the threshold value thresA, and the threshold value thresB are set in the filtering processor 42. The filtering processor 42 performs the filtering process on the parameters input from the parameter calculators in accordance with the addition ratio $\alpha$ determined from the variable diff and the above-described equation (1). The filtering processor 42 then supplies a filtering processed parameter to the image generator 18.

The face orientation parameter calculator 43 (FIG. 1) calculates a parameter controlling the face angle of the avatar generated by the image generator 18, in accordance with the face angle of the user corrected by the face orientation correction processor 41.

The face orientation correction processor 41 performs the correction process in the right-hand coordinate system while the image generator 18 performs the process thereof in the left-hand coordinate system. Referring to FIG. 8A, the right-hand coordinate system and the left-hand coordinate system are opposite each other in the rolling motion and the yawing motion. The face orientation parameter calculator 43 thus inverts the signs of the directions of the rolling motion and the yawing motion of the face angle of the user corrected by the face orientation correction processor 41.

In accordance with the function illustrated in FIG. 8B, the face orientation parameter calculator 43 calculates $y=x-p$ with x representing the input face angle of the user and y representing the output face angle of the avatar. Here, p represents an offset value for an initial value of the face orientation. In a standard state, p has a default value of zero (def=0.0).

The parameter of the face angle of the avatar output by the face orientation parameter calculator 43 is supplied to the filtering processor 42. The filtering processor 42 performs the filtering process on the parameter as illustrated in FIG. 7A. The addition ratio $\alpha$ used in the filtering process of the filtering processor 42 is determined by the function represented by the maximum value max=1.0, the threshold value thresA=0.1$\pi$, and the threshold value thresB=0.2$\pi$ as illustrated in FIG. 8C.

The face position parameter calculator 44 (FIG. 1) calculates the parameter controlling the face position of the avatar generated by the image generator 18, in accordance with the reference point, the horizontal width, and the vertical length (faceX, faceY, faceW, faceH) included in the face detection result information output by the filtering processor 42.

Figure 9A:
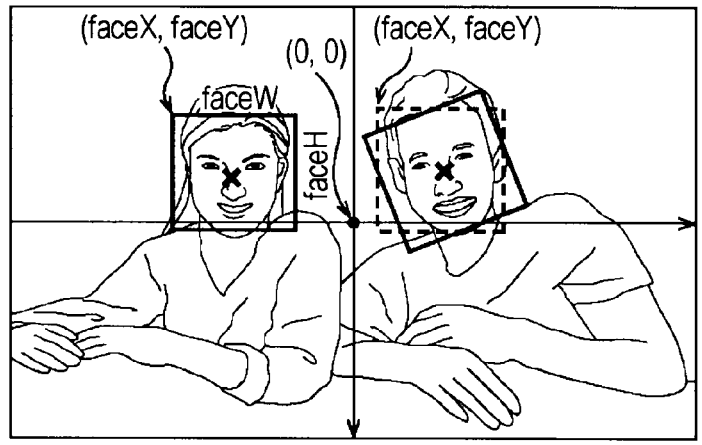
FIGS. 9A-9C illustrate parameters indicating a face position of the avatar.
Figure 9B:
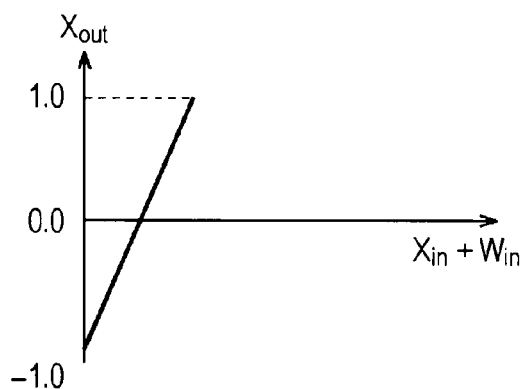

The top left corner of the face region is set as the reference point in the face detection result information output by the face detection processor 32 as illustrated in FIG. 3 while the center of the face region is set as the reference point (denoted by the letter x in FIG. 9A) by the image generator 18 as illustrated in FIG. 9A. The face recognition controller 31 performs the process thereof in the coordinate system (FIG. 3) with the top left corner of the entire image serving as the origin (0,0). The image generator 18 performs the process thereof with the center of the entire image serving as the origin (0,0) as illustrated in FIG. 9A.

The face position parameter calculator 44 calculates the function illustrated in FIG. 2B, i.e., the following equation (2), thereby determining, as parameters of the face position, coordinates of the center point of the face region in the coordinate system having the center of the entire image as the origin.

$$x_{out} = \left(x_{in} + \frac{w_{in}}{2.0}\right) \times 2.0 - 1.0 \qquad (2)$$

$$y_{out} = \left(y_{in} + \frac{h_{in}}{2.0}\right) \times 2.0 - 1.0$$

In equation (2), $x_{in}$ and $y_{in}$ represent reference points of the face region input to the face position parameter calculator 44, i.e., XY coordinates (faceX, faceY) of the reference points of the face region included in the face detection result information output by the face detection processor 32. Also, $w_{in}$ and $h_{in}$ represent respectively the horizontal width and vertical length (faceW, faceH) of the face region input to the face position parameter calculator 44. Also, $x_{out}$ and $y_{out}$ represent parameters (XY coordinates of points represented by the letter x's in FIG. 9A) of the face region output by the face position parameter calculator 44. Here, $x_{in}$, $y_{in}$, $w_{in}$, and $h_{in}$ are values in a normalized coordinate system with the top left corner of the entire image being the origin (0,0) and fall within a range of 0.0 to 0.1, and $x_{out}$ and $y_{out}$ are values in a normalized coordinate system with the center of the entire image being the origin (0,0) and fall within a range of from −0.1 to 0.1.

Figure 9C:
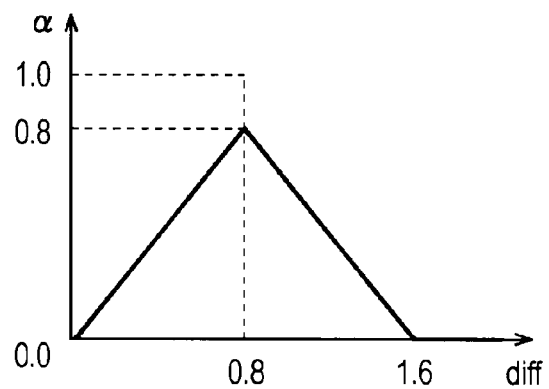

The parameter of the face position output by the face position parameter calculator 44 is supplied to the filtering processor 42. The filtering processor 42 then performs the filtering process on the parameter as illustrated in FIG. 7A. The addition ratio α used in the filtering process of the filtering processor 42 is determined in accordance with the function represented by the maximum value max=0.8, and the threshold value thresA=the threshold value thresB=0.8 as illustrated in FIG. 9C. Since the threshold value thresA equals the threshold value thresB, the function determining the addition ratio α has a mountain-like shape. It is noted that the mountain-like shaped function is stabler than the trapezoidal function.

The eye close ratio parameter calculator 45 (FIG. 1) calculates a parameter controlling the right eye close ratio and the left eye close ratio of the avatar generated by the image generator 18, based on the right eye open score and the left eye open score of the user determined by the attribute determiner 34.

The eye close ratio parameter calculator 45 calculates the following equation (3) based on a sigmoid function. The eye close ratio parameter calculator 45 thus calculates the parameters of the right eye close ratio and the left eye close ratio of the avatar from the open scores of the right eye and the left eye of the user.

$$y = gain \times \left(\frac{e^{-grad \times (x-ofs)}}{1 + e^{-grad \times (x-ofs)}}\right) - \frac{(gain-1)}{2} \qquad (3)$$

In equation (3), y is a close ratio, x is an open score, ofs is a value for offsetting the initial value of the open score, and grad is a value setting a mildness of the sigmoid function. The value calculated by the sigmoid function ranges from 0.0 to 1.0, and gain is an amplification factor according to which the value is amplified with respect to a center value (0.5).

Figure 10A:
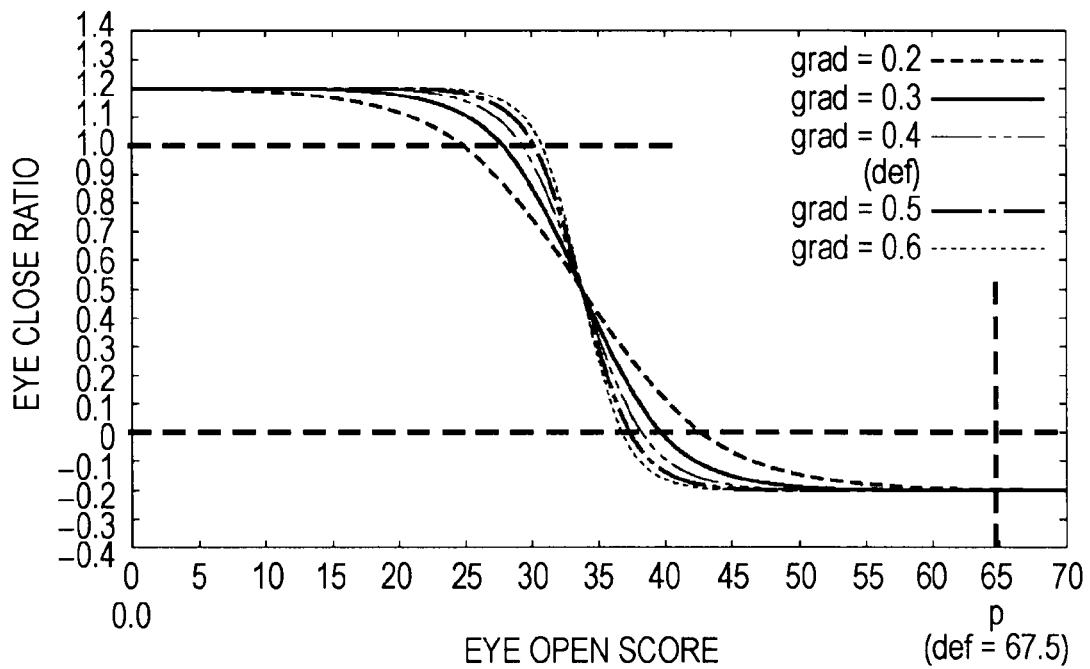
FIGS. 10A and 10B illustrate parameters indicating close ratios of the right eye and the left eye of the avatar.

FIG. 10A illustrates the relationship between the close ratio y and the open score x that are determined by calculating the sigmoid function using a plurality of grad values (0.2-0.6) with an amplification factor gain of 1.4. Here, p is a value that can be set as a maximum value for the open scores of the right eye and the left eye of the user. In the standard state, a maximum default value of 6.75 (def=6.75) is set for the open score. Also, a default value of 0.4 (def=0.4) is set for the value grad in the standard state. A maximum value and a minimum value can be set for the parameter of the close ratio. Referring to FIG. 10A, 1.0 is set for the maximum value and 0.0 is set for the minimum value.

The open scores of the right eye and the left eye of the user determined by the attribute determiner 34 are converted into the parameters of the close ratios of the right eye and the left eye of the avatar to be generated by the image generator 18, using the sigmoid function. In this way, individual variations in the size of the eye with the eye fully opened are reduced, and the effect of the face orientation on the close ratio and the open ratio of the eye is controlled. For example, a narrow-eyed person tends to have a low open score, and a person, when looking down, has a low open score. If the parameter of the close ratio is determined using the sigmoid function, that tendency is controlled.

The use of the sigmoid function permits not only one eye in an open state and the other eye in a closed state (winking eyes) to be represented but also half-closed eyes to be naturally represented. The opening and the closing of the eyes can be represented such that the motion of the eyelids are mild at the start of eye closing or eye opening. In place of the sigmoid function, a function causing the parameter of the close ratio to change linearly between a maximum value and a minimum value may be used to represent the narrowed eyes. However, the use of the sigmoid function expresses the opening and closing of the eyes even more closer to the actual motion of the human.

Figure 10B:
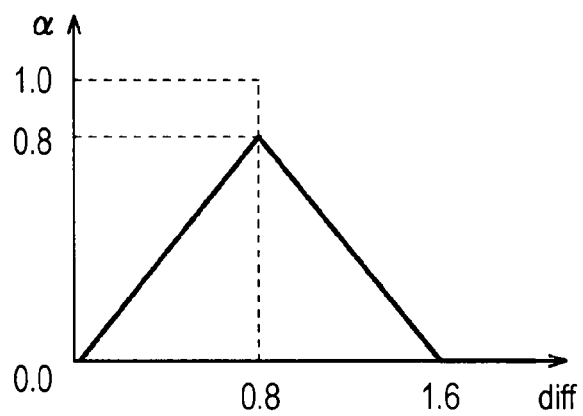

The parameters of the close ratios of the right eye and the left eye output by the eye close ratio parameter calculator 45 are supplied to the filtering processor 42. The filtering processor 42 performs the filtering process on the parameters as illustrated in FIG. 7A. The addition ratio α used in the filtering process of the filtering processor 42 is determined by the function represented by the maximum value max=0.8, and the threshold value thresA=the threshold value thresB=0.8 as illustrated in FIG. 10B.

The mouth open ratio parameter calculator 46 (FIG. 1) calculates a parameter controlling an open ratio of the mouth of the avatar to be generated by the image generator 18, based on 14 points identifying the outline of the mouth of the user detected by the part detail detector 35.

Before calculating the parameter, the mouth open ratio parameter calculator 46 performs two evaluation processes to determine on the basis of each point identifying the outline of the mouth of the user whether detection results of the outline of the mouth are correct.

In a first evaluation process, a distance in a vertical direction between predetermined points is used. For example, the mouth open ratio parameter calculator 46 determines vertical distances (R1, R2, and R3) between any two adjacent points of the four right points other than the rightmost point, out of the 14 points identifying the outline of the mouth of the user as illustrated in a left portion of FIG. 11A. Similarly, the mouth open ratio parameter calculator 46 determines vertical distances (L1, L2, and L3) between any two adjacent points of the four left points other than the leftmost point and vertical distances (C1, C2, and C3) between any two adjacent points of the four center points. If all the vertical distances thus determined are positive values, the mouth open ratio parameter calculator 46 determines that the detection results of the outline of the mouth are correct.

In a second evaluation process, a shape of a rectangular region having two predetermined points as opposing corners is used. For example, the mouth open ratio parameter calculator 46 determines shapes of rectangular regions (T1 and T2) having as opposing corners any two adjacent points of lower three points in the upper lip, out of the 14 points defining the outline of the mouth of the user as illustrated in a right portion of FIG. 11A. Similarly, the mouth open ratio parameter calculator 46 determines shapes of rectangular regions (T3 and T4) having as opposing corners any two adjacent points of upper three points in the lower lip, out of the 14 points defining the outline of the mouth of the user. If all the rectangular regions thus determined are horizontally elongated, the mouth open ratio parameter calculator 46 determines that the detection results of the outline of the mouth are correct.

If it is determined in the first and second evaluation processes that the detection results of the outline of the mouth are correct, the mouth open ratio parameter calculator 46 calculates the parameter of the open ratio of the avatar to be generated by the image generator 18, based on the 14 points identifying the outline of the mouth of the user detected by the part detail detector 35. If the detection results of the outline of the mouth are correct, the openness of the mouth of the user is reflected in the mouth of the avatar.

Figure 11A:
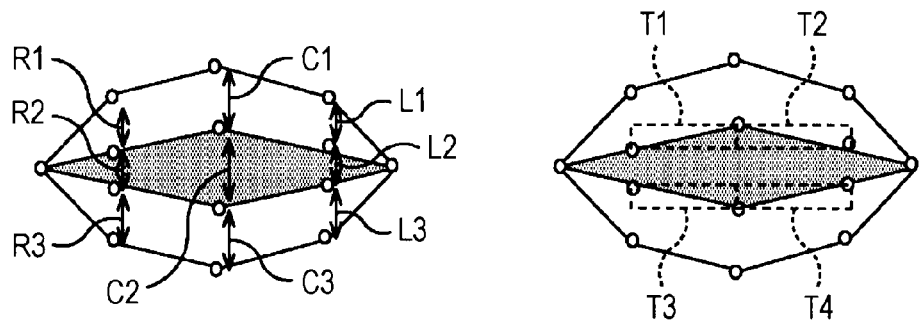
FIGS. 11A-11C illustrate parameters indicating a mouth open ratio of the avatar.
Figure 11B:
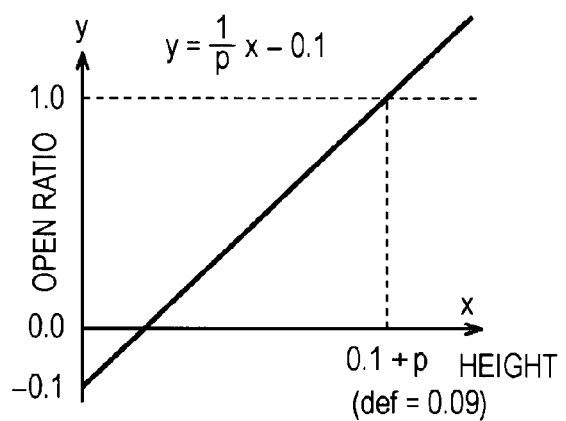

The mouth open ratio parameter calculator 46 calculates a function (y=(1/p)x−0.1) illustrated in FIG. 11B in response to an input of a distance between the center point on the lower side of the upper lip and the center point of the upper side of the lower lip (distance C2:height in FIG. 11A). The mouth open ratio parameter calculator 46 thus calculates the mount open ratio as a parameter. In the equation (y=(1/p)x−0.1), x is a vertical distance (height) as an input value, and y is a parameter as the mouth open ratio, and p is a value setting a maximum vertical distance (height) as the input value. In the standard state, 0.09 is set as a default value for p (def=0.09), and a maximum value of p is 0.19. The parameter indicating the mouth open ratio is set in the standard state with the mouth fully opened, and linearly mapped to the height.

A distance for calculating the parameter indicating the mouth open ratio may be determined from a distance between the center of the mouth and the center of the nose. In such a case, a value resulting from multiplying the distance between the center of the mouth and the center of the nose multiplied by 0.4 is used as the above-described input value (height).

Figure 11C:
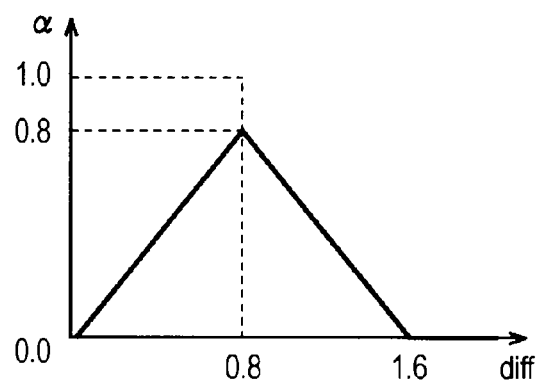

The parameter indicating the mouth open ratio output by the mouth open ratio parameter calculator 46 is supplied to the filtering processor 42, and the filtering process illustrated in FIG. 7A is then performed on the parameter. The addition ratio α used in the filtering process of the filtering processor 42 is determined in accordance with the function represented by the maximum value max=0.8, and the threshold value thresA=the threshold value thresB=0.8 as illustrated in FIG. 11C.

The smiling face parameter calculator 47 (FIG. 1) calculates a parameter controlling a smile ratio of the avatar, generated by the image generator 18, based on the smile score included in the attribute information output by the attribute determiner 34.

Figure 12A:
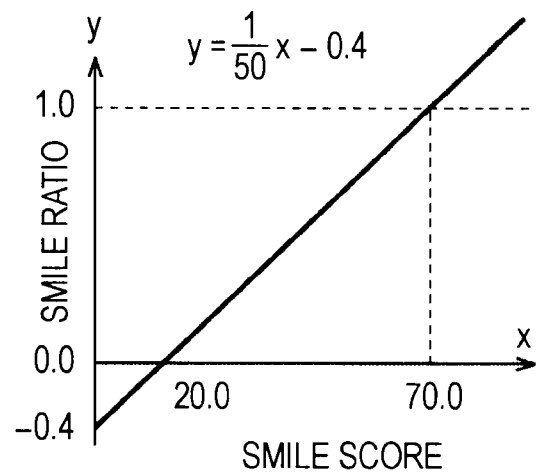
FIGS. 12A and 12B illustrate parameters indicating a smile ratio of the avatar.

The smile score detected by the attribute determiner 34 is a value ranging from 0 to 70. The smiling face parameter calculator 47 calculates a parameter indicating the smile score by calculating a function (y=(1/50)x−0.4) as illustrated in FIG. 12A. In the equation of the function, x represents a smile score as an input value, and y represents a parameter as an output value indicating a smile ratio.

Figure 12B:
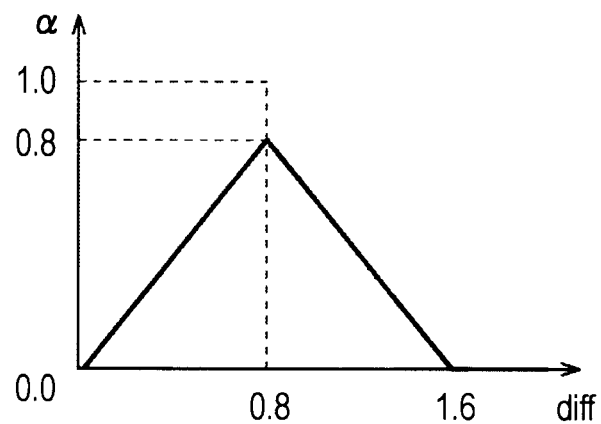

The parameter indicating the smile ratio output by the smiling face parameter calculator 47 is supplied to the filtering processor 42. The filtering processor 42 performs the filtering process illustrated in FIG. 7A. The addition ratio α used in the filtering process of the filtering processor 42 is determined in accordance with the function represented by the maximum value max=0.8, and the threshold value thresA=the threshold value thresB=0.8 as illustrated in FIG. 12B.

The parameters generated by the parameter calculators in the parameter generator 17 are supplied to the image generator 18 (FIG. 1) and the image generator 18 generates the avatar based on the parameters.

The image generator 18 includes a three-dimensional (3D) data manager 51, a shader manager 52, a renderer 53, and a synthesis processor 54.

The 3D data manager 51 manages 3D data of the avatar, i.e., manages a database (not illustrated) storing the 3D data of male, female, and child avatars. The 3D data manager 51 receives from the model selector 16 the model information (information indicating determination results as to whether a face in an image is of a male, a female, or a child). The 3D data manager 51 reads the 3D data of the avatar responsive to the model information from the database, and then supplies the read 3D data to the renderer 53.

The 3D data manager 51 manages a variety of data that is used to perform a geometry process to convert coordinates of a 3D model into an output (two-dimensional) image and a texture process to glue a texture for the purpose of imparting texture to the surface of the 3D model. The 3D data manager 51 then supplies the variety of data to the renderer 53.

When the renderer 53 renders the 3D data, the shader manager 52 manages a shading process. In the shading process, the shader manager 52 performs a computing operation to shade the 3D data with a predetermined light source (illumination). The shader manager 52 supplies the computation results of the shading process to the renderer 53.

The renderer 53 performs a rendering process by morphing the 3D data supplied by the 3D data manager 51, in accordance with expression parameters output by the parameter calculators in the parameter generator 17 (the parameters indicating the eye open ratio of each of the right eye and the left eye of the avatar, the parameter indicating the smile ratio of the avatar, and the parameter indicating the mouth open ratio of the avatar).

The 3D data manager 51 supplies to the renderer 53 the 3D data of a plurality of basic expressions for a single model. For example, the 3D data manager 51 supplies to the renderer 53 expressionless 3D data, 3D data with the right eye closed, 3D data with the left eye closed, 3D data of a smiling face, and 3D data with the mouth opened for each of a male model, a female model, and a child model as illustrated in FIG. 13.

The renderer 53 weighted sums the apexes of the basic expression 3D data with corresponding parameters, thereby determining each apex of the 3D data to be rendered. More specifically, a predetermined apex $P_{synth}(x,y,z)$ of the 3D data to be rendered is $P_{synth}(x,y,z)=P_{reye\_close}(x,y,z)W_{reye\_close}+P_{leye\_close}(x,y,z)W_{leye\_close}+P_{mouth\_open}(x,y,z)W_{mouth\_open}+P_{smile}(x,y,z)W_{smile}+P_{normal}(x,y,z)(1-W_{reye\_close}-W_{leye\_close}-W_{smile}-W_{mouth\_open})$. In this equation, $P_{reye\_close}(x,y,z)$ represents a predetermined apex of the 3D data with the right eye closed, $W_{reye\_close}$ represents a parameter indicating the eye close ratio of the right eye, $P_{leye\_close}(x,y,z)$ represents a predetermined apex of the 3D data with the left eye closed, $W_{leye\_close}$ represents a parameter indicating the eye close ratio of the left eye, $P_{mouth\_open}(x,y,z)$ represents a predetermined apex of the 3D data with the mouth opened, $W_{mouth\_open}$ represents a parameter indicating the mouth open ratio of the avatar, $P_{smile}(x,y,z)$ represents a predetermined apex of the smiling 3D data, $W_{smile}$ represents a parameter indicating the smile ratio of the avatar, and $P_{normal}(x,y,z)$ represents a predetermined apex of the expressionless 3D data.

The renderer 53 performs the rendering process using the morphed 3D data that results from weighted summing the basic expression 3D data with the corresponding parameters. The renderer 53 thus generates an image of the face of the avatar. The renderer 53 also performs the rendering process by setting an orientation of the morphed 3D data such that the image of the avatar is oriented in accordance with the parameter indicating the face angle of the avatar output by the face orientation parameter calculator 43.

The synthesis processor 54 receives the image of the face of the avatar rendered by the renderer 53, and the parameter controlling the face position of the avatar from the face position parameter calculator 44. The synthesis processor 54 also receives from the camera input unit 14 the image captured by the camera 12.

The synthesis processor 54 performs a synthesis process to replace the face of the user with the avatar. In the synthesis process, the face of the avatar supplied by the renderer 53 is overlaid at a position of the face of the user in the image captured by the camera 12 (the input image illustrated in FIG. 2A) in accordance with the parameter controlling the face of the avatar. The synthesis processor 54 supplies to the display 13 the image obtained through the synthesis process (the output image as illustrated in FIG. 2B). The image is thus displayed on the display 13.

Figure 14:
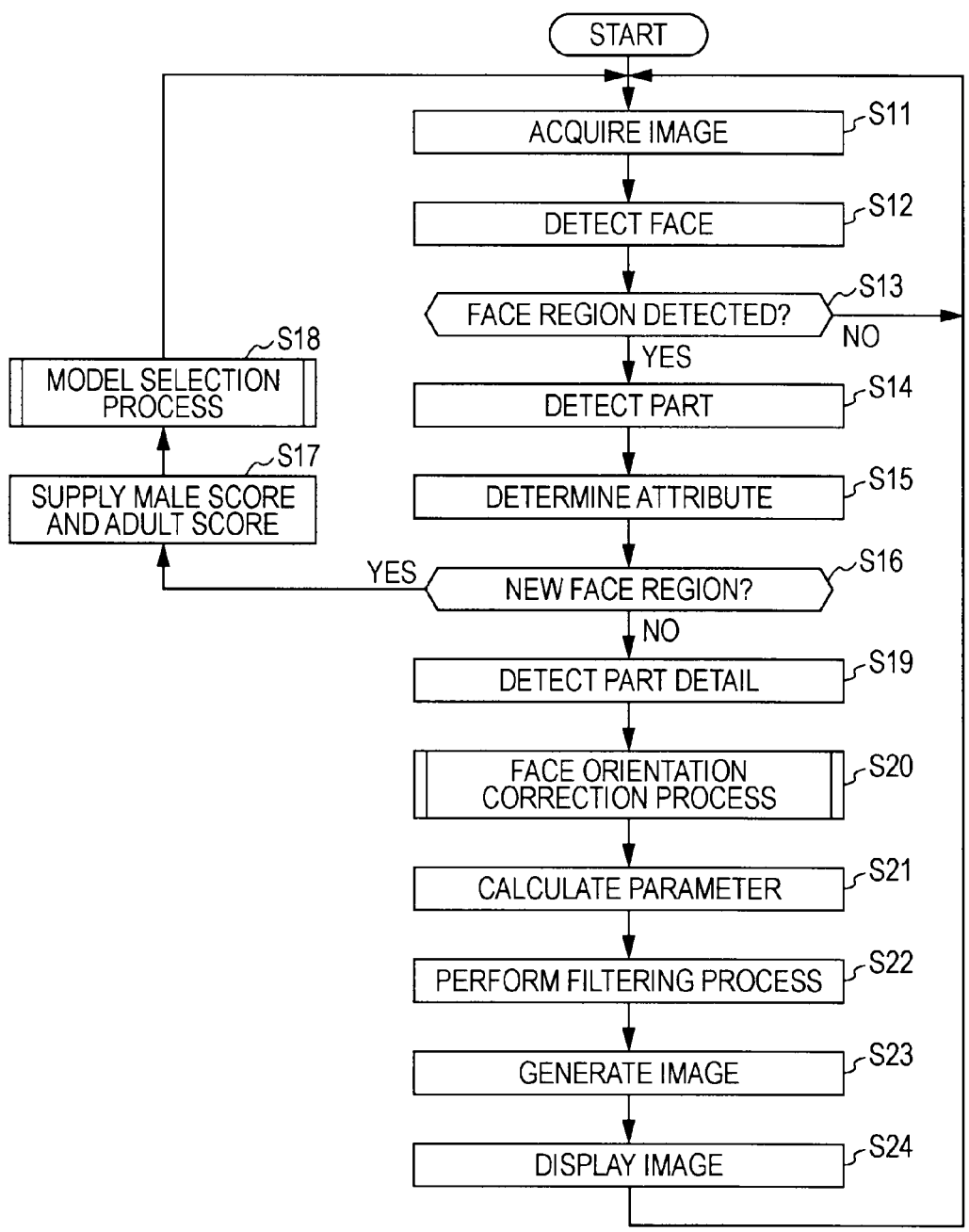
FIG. 14 is a flowchart of an image processing process executed by the image processing apparatus.

FIG. 14 is a flowchart illustrating an image processing process performed by the image processing apparatus 11 illustrated in FIG. 1.

The image processing apparatus 11 starts the process in response to a user operation. In step S11, the camera input unit 14 acquires an image input by the camera 12. The camera input unit 14 decodes the image (raw data) supplied by the camera 12 with the decoder 22 thereof, and then supplies the decoded data to the face detection processor 32 in the face recognizer 15. Processing proceeds to step S12.

In step S12, the face detection processor 32 performs the face detection process to detect the face region of the face of the user from the image supplied by the camera input unit 14 in step S11. Upon detecting the face region, the face detection processor 32 outputs the face detection result information.

Processing proceeds from step S12 to step S13. The face recognition controller 31 determines whether the face detection processor 32 has detected the face region in step S12, i.e., determines whether the face detection processor 32 has output the face detection result information.

If the face recognition controller 31 determines in step S13 that the face detection processor 32 has not detected the face region, processing returns to step S11. Steps S11 and step S12 are repeated. If the face recognition controller 31 determines in step S13 that the face detection processor 32 has detected the face region, processing proceeds to step S14.

In step S14, the part detector 33 detects a part of the face from the face region indicated by the face detection result information output by the face detection processor 32 in step S12. The part detector 33 outputs the part information indicating coordinates of the center of each of the parts including the right eye, the left eye, the nose, and the mouth, and the face position information indicating the position and the posture of the face determined from the parts. Processing proceeds to step S15.

In step S15, the attribute determiner 34 determines the attribute of the face of the user within the face region based on the part information output by the part detector 33 in step S14, and outputs the attribute information indicating the determination results. As previously discussed, the attribute information includes the male score, and the adult score.

Processing proceeds from step S15 to step S16. The face recognition controller 31 determines whether the face region as a current process target is a new face region. The image processing apparatus 11 processes the image input from the camera 12 on a per frame basis. If the number of frames from a frame from which the face region as the current process target was first detected to an immediately preceding frame detected in step S12 is 15 or less, the face recognition controller 31 determines that the face region as the current process target is a new target. If the number of frames is more than 15, the face recognition controller 31 determines that the face region as the current process target is not a new target.

If the face recognition controller 31 determines in step S16 that the face region as the current process target is a new target, processing proceeds to step S17.

In step S17, the face recognition controller 31 supplies to the model selector 16 the male score and the adult score included in the attribute information output by the attribute determiner 34 in step S15. Processing proceeds to step S18.

In step S18, the model selector 16 performs a model selection process based on the male score and the adult score supplied by the face recognition controller 31 in step S17. In the model selection process, the model selector 16 selects one of the male model, the female model, and the child model as the 3D data of the avatar to replace the face of the user in the face region. The model selection process is described later with reference to FIG. 15. Subsequent to the model selection process in step S17, processing returns to step S11. The same process as described above is then repeated on a next frame.

If the face recognition controller 31 determines in step S16 that the face region as the current process target is not a new target, processing proceeds to step S19.

In step S19, the part detail detector 35 detects a point (see FIGS. 5A and 5B) identifying in detail the part of the face of the user in the face region. The part detail detector 35 outputs the part result information. Processing proceeds to step S20.

In step S20, the face orientation correction processor 41 performs a face orientation correction process to correct the orientation of the face of the user in the face region. The face orientation correction process is described later with reference to FIG. 16. Subsequent to the face orientation correction process, processing proceeds to step S21.

In step S21, each parameter calculator in the parameter generator 17 calculates the corresponding parameter. More specifically, the face orientation parameter calculator 43 calculates the parameter indicating the face angle of the avatar from the face angle of the user output by the face orientation correction processor 41 in step S20. The face position parameter calculator 44 calculates the parameter indicating the face position of the avatar from the face detection result information output by the face recognition controller 31 in step S12.

Furthermore, the eye close ratio parameter calculator 45 calculates the eye close ratios of the right eye and the left eye of the avatar from the eye open scores of the right eye and the left eye of the user determined by the attribute determiner 34 in step S15. The mouth open ratio parameter calculator 46 calculates the parameter indicating the mouth open ratio of the avatar from the 14 points identifying the outline of the mouth of the user detected by the part detail detector 35 in step S19. The smiling face parameter calculator 47 calculates the parameter indicating the smile ratio of the avatar from the smile score included in the attribute information output by the attribute determiner 34 in step S15.

In step S22, the filtering processor 42 performs the filtering process on the parameters respectively output by the face orientation parameter calculator 43, the face position parameter calculator 44, the eye close ratio parameter calculator 45, the mouth open ratio parameter calculator 46, and the smiling face parameter calculator 47 to stabilize the parameters. The filtering processor 42 then outputs the parameters stabilized through the filtering process to the image generator 18.

In step S23, the image generator 18 performs an image generation process to generate an image to be displayed on the display 13.

More specifically, the 3D data manager 51 in the image generator 18 supplies the renderer 53 with the 3D data of the five expressions of the avatar to replace the face of the user in the face region in accordance with the model information output by the model selector 16 in the model selection process in step S18. The renderer 53 generates the image of the avatar by morphing the 3D data of the five expressions in response to the parameters supplied by the filtering processor 42. The synthesis processor 54 synthesizes the image of the avatar rendered by the renderer 53 at the position of the face of the user in the image captured by the camera 12. The synthesis processor 54 thus generates the image with the face of the user replaced with the avatar. Subsequent to the image generation process, processing proceeds to step S24.

In step S24, the image generator 18 supplies the image generated in step S23 to the display 13 and the display 13 displays the image. Processing returns to step S11. The same process as the one discussed above is repeated on a next frame.

Since an avatar matching the attribute of the user is automatically displayed, the image processing apparatus 11 conserves the user's time for specifying the avatar. In related art, the user specifies an avatar matching the attribute of the user in order to display the avatar in place of the user's face. In contrast, the image processing apparatus 11 conserves such time, and causes the avatar matching the attribute of the user to be displayed on the display 13 substantially at the same time as when the image of the user is captured by the camera 12. The user can thus feel togetherness with the avatar. For example, when the image processing apparatus 11 is used in a virtual space such as in game playing or chat room, the user finds more empathy for the virtual space.

Since each parameter is filtering processed, the motion of the avatar becomes smooth. The user feels more togetherness with the avatar. For example, an error of several pixels is tolerated in the face detection process for detecting the face in the image. If the face remains motionless (or is slowly moving), the avatar may vibrate in position (or fluctuate in at high speed within a slight swing) because of the error. In such a case, the filtering process prevents the avatar from vibrating, and frees the user (who views an image or plays a game in the virtual space) from a sense of discomfort otherwise caused by such a vibration.

As discussed with reference to FIGS. 7A and 7B, the addition ratio α is dynamically determined based on the variable diff between the current input value and the immediately preceding input value. The filtering process appropriate for both the face remaining motionless (or slowly moving) and the face moving rapidly is performed. More specifically, when the face remains motionless, the value of the addition ratio α is set to be small (i.e., a weight of an immediately preceding output value (parameter $y_{t-1}$) is set to be large and a weight of an input value (parameter $x_t$ is set be small) in order to stabilize the position of the face. When the face moves rapidly, the value of the addition ratio α is set to be large in order to increase follow-up performance responsive to the movement of the face. The avatar is thus displayed at a more accurate position. If the face moves rapidly, an error involved in the face detection process becomes relatively small with respect to the travel distance of the face. The vibration of the avatar described above is less noticeable. The filtering process thus provides an intuitive visual effect to the user.

Since an expression is synthesized for rendering based on the expression parameters generated by the parameter generator 17, the avatar can have a more expressive face than ever before. The image processing apparatus 11 performing the image processing process provides the user with a new experience in virtual communication and content-rich communications in a virtual space.

Figure 15:
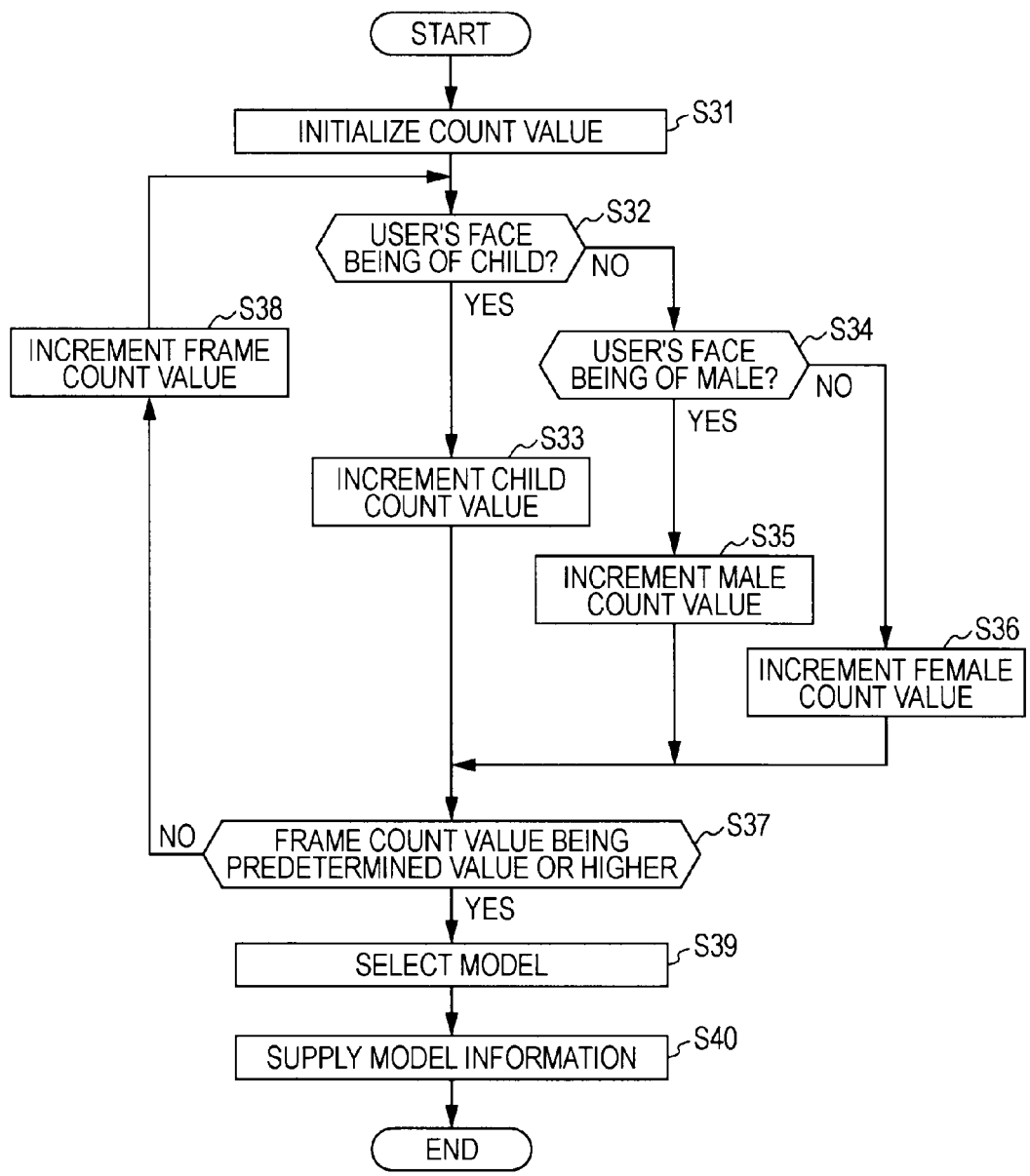
FIG. 15 is a flowchart of a model selection process.

FIG. 15 is a flowchart illustrating the model selection process in step S18 of FIG. 14.

In step S31, the model selector 16 initializes count values used in the model selection process. Used in the model selection process are a frame count value indicating the number of processed frames, a child count value indicating the number of times of face determined as being a child, a male count value indicating the number of times of face determined as being a male, and a female count value indicating the number of times of face determined as being a female. The model selector 16 initializes these count values (to zero, for example). Processing proceeds to step S32.

In step S32, the model selector 16 determines whether the face of the user in the face region is of a child, based on the adult score supplied by the face recognition controller 31 in step S17 of FIG. 14. For example, if the adult score is lower than a predetermined threshold (for example, an intermediate value between the maximum value and the minimum value of the adult score), the model selector 16 determines that the face of the user is of a child. If the adult score is equal to or higher than the predetermined threshold value, the model selector 16 determines that the face of the user in the face region is of an adult.

If the model selector 16 determines in step S32 that the face of the user in the face region is of a child, processing proceeds to step S33. The model selector 16 increments the child count value by one.

On the other hand, if the model selector 16 determines in step S32 that the face of the user in the face region is not of a child, processing proceeds to step S34.

In step S34, the model selector 16 determines whether the face of the user in the face region is of a male, based on the male score supplied by the face recognition controller 31. For example, if the male score is equal to or higher than a predetermined threshold (for example, an intermediate value between the maximum value and the minimum value of the adult score), the model selector 16 determines that the face of the user is of a male. If the male score is lower than the predetermined threshold value, the model selector 16 determines that the face of the user in the face region is not of a male.

If the model selector 16 determines in step S34 that the face of the user in the face region is of a male, processing proceeds to step S35. The model selector 16 increments the male count value by one. On the other hand, if the model selector 16 determines in step S34 that the face of the user in the face region is not of a male, processing proceeds to step S36. The model selector 16 increments the female count value by one.

Subsequent to one of the steps S33, S35, and S36, processing proceeds to step S37. The model selector 16 determines whether the frame count value is equal to or higher than a predetermined count set for the selection of the model (for example, 15).

If the model selector 16 determines in step S37 that the frame count value is not equal to or higher than the predetermined count set for the selection of the model (lower than the predetermined count), processing proceeds to step S38. In step S38, the model selector 16 increments the frame count value by one. Processing returns to step S32. The same process as described above is repeated on a next frame.

If the model selector 16 determines in step S37 that the frame count value is equal to or higher than the predetermined count set for the selection of the model, processing proceeds to step S39.

In step S39, the model selector 16 references the child count value, the male count value, and the female count value in order to select as a model of the 3D data of the avatar one of the child, the male, and the female having the highest number of determinations (the highest count value).

Processing proceeds from step S39 to step S40. The model selector 16 supplies to the image generator 18 information indicating the selection results in step S39. Processing thus ends.

The model selector 16 selects a model based on a plurality of determination results, thereby increasing an accuracy at which a model matching the user is selected. For example, the attribute determiner 34 can erroneously recognize the model depending on the effect of illumination and the expression of the user (for example, a male is mistaken for a female or vice versa when the male is smiling), and an unstable score can be output. If the model selector 16 uses a plurality of determination results even in such a case, the effect of the erroneous recognition made by the attribute determiner 34 is controlled.

Figure 16:
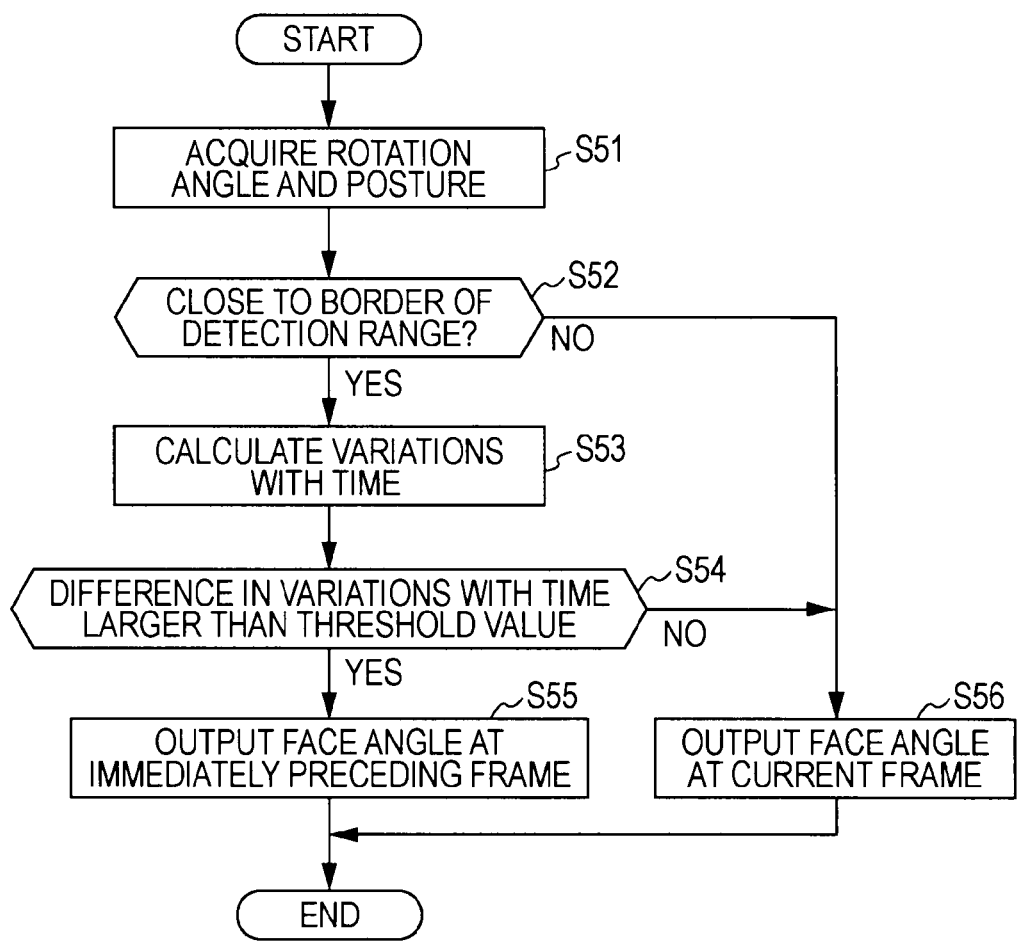
FIG. 16 is a flowchart of a face orientation correction process.

FIG. 16 is a flowchart of the face orientation correction process in step S20 of FIG. 14.

In step S51, the face orientation correction processor 41 acquires the rotation angle (faceRoll, faceYaw) of the face region included in the face detection result information output by the face detection processor 32 when the face region is detected in step S12 of FIG. 14, and also acquires the posture (PoseRoll, PoseYaw) of the face region included in the face position information output by the part detector 33 in step S14.

Processing proceeds from step S51 to step S52. The face orientation correction processor 41 determines whether the orientation of the user face in the face region is in the vicinity of the border of the detection range.

The vicinity of the border of the detection range is defined by a ratio to the detection range in the face detection result information. The ratio defining the vicinity of the border of the detection range is pre-set in the face orientation correction processor 41. For example, the ratio of the vicinity of the border of the detection range may be set to be 87.5%. If the rotation angle (faceRoll, faceYaw) of the face region is larger than 87.5% of the detection range in the face detection result information, it is determined that the orientation of the face of the user is in the vicinity of the border of the detection range.

The detection range of the rolling motion of the face in the face detection result information may be about ±20 degrees as illustrated in FIG. 6. If the rotation angle of the face region (faceRoll) is greater than about ±17.5, the face orientation correction processor 41 determines that the orientation of the face of the user is in the vicinity of the border of the detection range. Similarly, the detection range of the yawing motion of the face in the face detection result information may be about ±35 degrees. If the rotation angle of the face region (faceYaw) is greater than about ±30.6, the face orientation correction processor 41 determines that the orientation of the face of the user is in the vicinity of the border of the detection range. In this way, the face orientation correction processor 41 determines whether the orientation of the face of the user is in the vicinity of the border of the detection range in each of the rolling motion and the yawing motion of the face. If the face detection result information for the pitching motion is also available, the face orientation correction processor 41 determines in a similar process whether the orientation of the face of the user is in the vicinity of the border of the detection range.

The vicinity of the border of the detection range is defined by the ratio to the detection range in this way. Alternatively, the vicinity of the border of the detection range may be defined directly by an angle (for example, the vicinity of the border of the detection range may be defined by 3 degrees from the border of the detection range). The detection range of the orientation of the face of the user is not limited to those listed in FIG. 6, and may be different depending on performance of a detector in use (or a face detection dictionary used by the detector). For example, a detector may have detection ranges of ±40 degrees for the rolling motion, ±20 degrees for the pitching motion, and ±45 degrees for the yawing motion, and another detector may have detection ranges of ±90 degrees for the rolling motion, ±45 degrees for the pitching motion, and ±45 degrees for the yawing motion.

If the face orientation correction processor 41 determines that the orientation of the face of the user in the face region is in the vicinity of the border of the detection range, processing proceeds to step S53. The face orientation correction processor 41 calculates time variations of the rotation angle and the posture of the face region.

The face orientation correction processor 41 stores the rotation angle of the face region and the posture of the face region output in the process of the immediately preceding frame, and calculates the time variations between the immediately preceding frame and the current frame. More specifically, the time variation of the rotation angle of the face region $\text{diff}_{tgt}$ ($=|\text{tgtIn}_t-\text{tgtIn}_{t-1}|$) is determined, where $\text{tgtIn}_t$ represents the current face angle and $\text{tgtIn}_{t-1}$ represents the face angle of the immediately preceding frame. Furthermore, the time variation of the posture of the current face region $\text{diff}_{pos}$ ($=|\text{posIn}_t-\text{posIn}_{t-1}|$) is determined, where $\text{posIn}_t$ represents the current face angle and $\text{posIn}_{t-1}$ represents the face angle of the immediately preceding frame.

Processing proceeds from step S53 to step S54. The face orientation correction processor 41 determines whether a difference between the time variations calculated in step S54 ($=|\text{diff}_{tgt}-\text{diff}_{pos}|$) is larger than a predetermined threshold value.

If the face orientation correction processor 41 determines in step S54 that the difference is larger than the predetermined threshold value, processing proceeds to step S55. The face orientation correction processor 41 outputs the face angle ($\text{posIn}_{t-1}$) of the immediately preceding frame, and the face orientation correction process thus ends. Since a large time variation is caused by noise, the face orientation correction processor 41 outputs the face angle ($\text{posIn}_{t-1}$) of the immediately preceding frame in place of the current face angle ($\text{posIn}_t$) suffering from such a large variation in order to control the vibration of the avatar.

The face orientation correction processor 41 may determine in step S52 that the orientation of the face of the user in the face region is not in the vicinity of the border of the detection range (for example, within 87.5% of the detection range as described above), or the face orientation correction processor 41 may determine in step S54 that the difference between the time variations is not larger than the predetermined threshold value (the time variation is smaller than the predetermined threshold value). In such a case, processing proceeds to step S56.

In step S56, the face orientation correction processor 41 outputs the face angle ($posIn_t$) of the current frame. The face orientation correction process thus ends. In this case, the orientation of the face of the user is not in the vicinity of the border of the detection range, and it is determined that an accurate face angle is detected. The time variation is small, and no noise is likely to have occurred. The face orientation correction processor 41 outputs the face angle ($posIn_t$) of the current frame.

The face orientation correction process prevents the detection results from being varied at irregular intervals even if the orientation of the face of the user is in the vicinity of the border of the detection range. The face of the avatar is free from unnatural vibration in the vicinity of the border of the detection range. The avatar can thus accurately follow the movement of the face of the user.

In accordance with the present embodiment, the expression of the avatar is synthesized using the expression parameters discussed with reference to FIG. 13. Many more parameters may be used as parameters for the synthesis of the expression of the avatar in addition to those expression parameters.

FIG. 17 illustrates an example of parameters that can be used in the expression synthesis. Referring to FIG. 17, the types of parameters available in the expression synthesis include emotional parameters, part parameters, and viseme parameters.

The emotional parameters include a sadness parameter and an anger parameter determined using the attribute determiner 34, in addition to a smiling parameter determined from the smile score included in the attribute information output by the attribute determiner 34.

The part parameters include a blinking parameter, an eyebrow parameter, an eyeball parameter, and a mouth closing and opening parameter determined from 55 points output by the part detail detector 35 (see FIG. 5A).

Figure 18A:
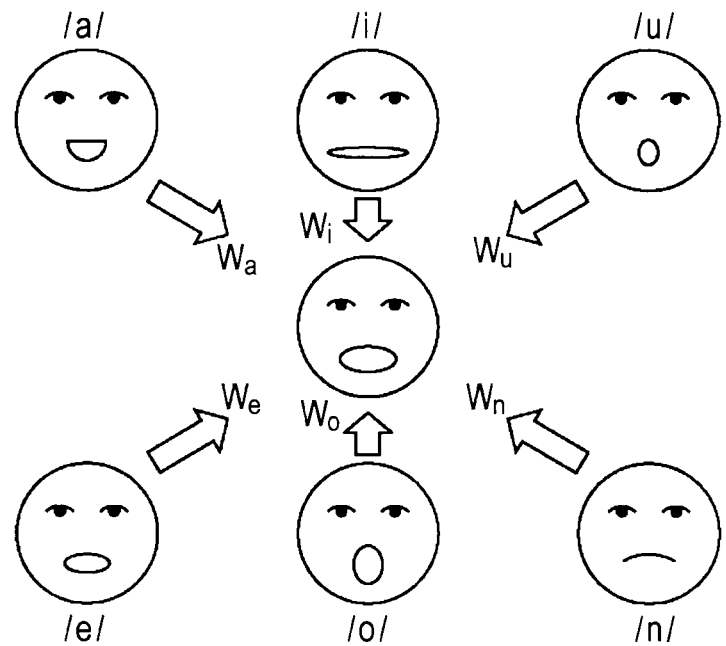
FIGS. 18A and 18B illustrate a synthesis process of mouth shapes.

The viseme parameters included a viseme /a/ parameter, a viseme /i/ parameter, a viseme /u/ parameter, a viseme /e/ parameter, a viseme /o/ parameter, and a viseme /n/ parameter determined from a vowel determination score output by the vowel viseme determiner 62 of FIGS. 18A and 18B to be discussed later. The motion of the mouth of the user is faithfully reflected in the avatar by synthesizing the mouth shape of the avatar based on these viseme parameters.

A mouth shape synthesis process for synthesizing the mouth shape of the avatar based on the viseme parameter is described below with reference to FIGS. 18A and 18B.

The image processing apparatus 11 stores the basic mouth shape of each vowel to synthesize a mouth shape. More specifically, the basic mouth shapes for pronouncing a vowel /a/, a vowel /i/, a vowel /u/, a vowel /e/, a vowel /o/, and a vowel /n/ are stored as illustrated in FIG. 18A. Here, the pronunciation /n/ includes a pronunciation /p/.

A mouth shape is synthesized based on a viseme parameter $W_a$ of the vowel /a/, a viseme parameter $W_i$ of the vowel /i/, a viseme parameter $W_u$ of the vowel /u/, a viseme parameter $W_e$ of the vowel /e/, a viseme parameter $W_o$ of the vowel /o/, and a viseme parameter $V_n$, of the vowel /n/ as weights for the respective basic shapes. The motion of the mouth of the user is even more faithfully reflected in the avatar.

Figure 18B:
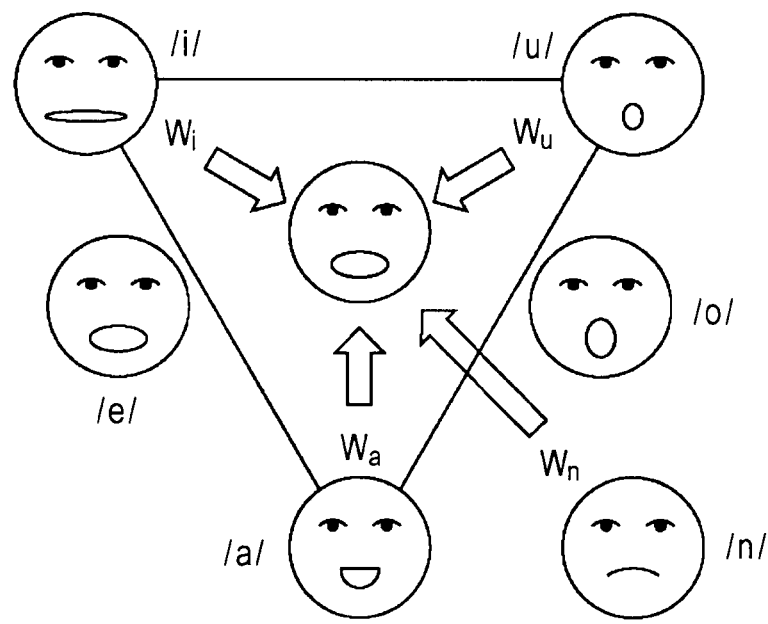

Referring to FIG. 18B, the basic shape for pronouncing the vowel /e/ is generated by synthesizing the basic shape for pronouncing the vowel /i/ and the basic shape for pronouncing the vowel /a/. The basic shape for pronouncing the vowel /o/ is generated by synthesizing the basic shape for pronouncing the vowel /u/ and the basic shape for pronouncing the vowel /a/.

The mouth shape may be synthesized with the viseme parameter $W_a$ of the vowel /a/, the viseme parameter $W_i$ of the vowel /i/, the viseme parameter $W_u$ of the vowel /u/, and the viseme parameter $V_n$ of the vowel /n/ serving as the weights of the basic shapes. In the same manner as illustrated in FIG. 18A, the motion of the mouth of the user is faithfully reflected in the avatar. Through these processes, the number of parameters used in the synthesis of the mouth shape is reduced, and the process itself is simplified. The number of basic shapes of vowels to be stored is also reduced.

The viseme parameters are determined from the points identifying the outline of the mouth detected by the part detail detector 35. The viseme parameters may also be determined through voice recognition.

FIG. 19 is a block diagram illustrating a mouth shape synthesis processor 61 synthesizing the mouth shape of the avatar on the basis of the viseme parameter.

The mouth shape synthesis processor 61 illustrated in FIG. 19 includes a vowel viseme determiner 62, a voice recognition vowel determiner 63, a viseme parameter determiner 64, a mouth shape model database 65, and a mouth shape synthesizer 66.

The vowel viseme determiner 62 receives the points identifying the outline of the mouth of the user detected from the image by the part detail detector 35. The vowel viseme determiner 62 then determines the shape of the mouth from the points. The vowel viseme determiner 62 then supplies to the viseme parameter determiner 64 a vowel determination score indicating the ratio of each vowel, at which the shape of the mouth is represented by a combination of the vowel /a/, the vowel /u/, the vowel /e/, the vowel /o/, and the vowel /n/ illustrated in FIGS. 18A and 18B.

The voice recognition vowel determiner 63 receives a voice input by a voice input device (not illustrated) such as a microphone. The voice recognition vowel determiner 63 performs a voice recognition process to the voice, thereby determining a vowel pronounced by the user, and supplying the vowel determination score to the viseme parameter determiner 64.

The viseme parameter determiner 64 determines as a viseme parameter the mean value of the vowel determination score from the vowel viseme determiner 62 and the vowel determination score from the voice recognition vowel determiner 63. The viseme parameter determiner 64 then supplies the viseme parameter to the mouth shape synthesizer 66. If the voice recognition vowel determiner 63 is not used, the vowel determination score from the vowel viseme determiner 62 serves as a viseme parameter.

As described with reference to FIGS. 18A and 18B, the mouth shape model database 65 stores the 3D data of the basic mouth shape for each vowel. The mouth shape synthesizer 66 weighted sums the apexes of the 3D data for the basic mouth shapes with the respective viseme parameters of the vowels, thereby synthesizing the mouth shape.

The mouth shape synthesis processor 61 synthesizes the mouth shape of the avatar, and the renderer 53 renders the 3D data of the mouth shape. The shape of the mouth of the avatar is thus more closely approximated to the shape of the mouth of the user. The generated avatar may speak in a gesture more similar to a gesture with which the user speaks. Since the mouth shape of the avatar is closely approximated to the mouth shape of the user, the user feels togetherness with the avatar. The user feels more empathy for the image displayed on the display 13.

The image processing apparatus 11 performs the process based on parameters listed in FIG. 20. FIG. 20 lists the parameters to be used by the image processing apparatus 11.

Model selection parameters include an age parameter, a sex parameter, and a race parameter. Other parameters include glass parameter. The parameters are determined based on the attribute determined by the attribute determiner 34.

The age parameter indicates a parameter indicating an age bracket having a face displayed in the image (age brackets delineated by age, such as age brackets of teens, twenties, thirties, or roughly delineated age groups, such as children (0-teens), adults (twenties-fifties), elder (sixties or older)). The attribute determiner 34 determines the attribute of the face displayed in the image, and outputs a score representing a numerical rating of the degree of adult, the degree of child, and the degree of elder. Depending on the score, the age parameter is determined. The 3D data manager 51 supplies the 3D data of the avatar based on the age parameter to the renderer 53. An avatar closer to the user's age than an avatar simply sorted as of adult or child is displayed.

The sex parameter indicates sex of the face (male or female) displayed in the image.

The race parameter indicates a race of the face displayed in the image (such as white, black, and yellow races). The attribute determiner 34 determines the attribute of the face displayed in the image, and outputs a score representing a numerical rating of the degree of each race. The race parameter is determined based on the score. The 3D data manager 51 supplies to the renderer 53 a race texture and 3D data of the race parameter. An avatar more like the face of the user is thus displayed.

The glass parameter indicates whether glasses are worn on the face of the displayed image. The attribute determiner 34 outputs a score representing a numerical rating of the degree of whether glasses are worn on the face of the displayed image. The glass parameter is determined on the score. If the glass parameter indicates that glasses are worn, the 3D data manager 51 supplies the 3D data of glasses to the renderer 53. An avatar wearing the glasses is automatically displayed.

In accordance with the present embodiment, a model is automatically selected in accordance with the attribute of the user (child, male, female). If a user is identified by performing precisely the face recognition on the user, the face of the user may be replaced with an avatar pre-registered by the user. If the user is individually identified through the face recognition, the user may be free from specifying the user's own avatar. The user can thus enjoy in a seamless fashion a real space and a virtual space (space of the image displayed on the display 13).

The attribute of the user determined by the image processing apparatus 11 does not necessarily include all the above-described parameters. It is sufficient if the attribute includes one of the above-described parameters.

The parameter generator 17 of FIG. 1 outputs a parameter that is obtained when the filtering processor 42 performs the filtering processing the parameter calculated by each parameter calculator. Even if an unstable variation is contained in the parameter calculated by each parameter calculator, the filtering processor 42 removes the unstable variation from the parameter. A stable parameter is thus output. The avatar generated by the image generator 18 smoothly moves.

The filtering processor 42 is constructed of a one-state filter as illustrated in FIG. 7A. An error may occur in the calculation performed by a parameter calculator in the parameter generator 17 and a parameter output by the parameter calculator may suffer from a sharp variation. It is difficult to remove such a sharp variation. If the filtering processor 42 is constructed of a multi-stage filter, such a sharp variation contained in the parameter can be reduced. If the filtering processor 42 constructed of a multi-stage filter is used, a filtering process takes time. The behavior of the avatar generated by the image generator 18 is subject to a delay with respect to the behavior of the user.

It is desirable that a filtering process remove the effect of an error and be free from a delay in the behavior of an avatar even if the error occurs in the calculation of a parameter calculator in the parameter generator 17 and the parameter output by the parameter calculator suffers from a sharp variation.

The basic concept of the filtering process desirable of the parameter generator 17 is described with reference to FIG. 21. The parameters output by the parameter calculators in the parameter generator 17 (i.e., the face orientation parameter calculator 43, the face position parameter calculator 44, the eye close ratio parameter calculator 45, the mouth open ratio parameter calculator 46, and the smiling face parameter calculator 47) are estimation results of the state of the face of the user based on the detection result of the face recognizer 15 (the orientation of the face, the position of the face, the close and open ratio of the eye, the close and open ratio of the mouth, and the degree of smile). In the discussion that follows, a parameter as a process target in the filtering process is also referred to as a state estimation result value.

Figure 21:
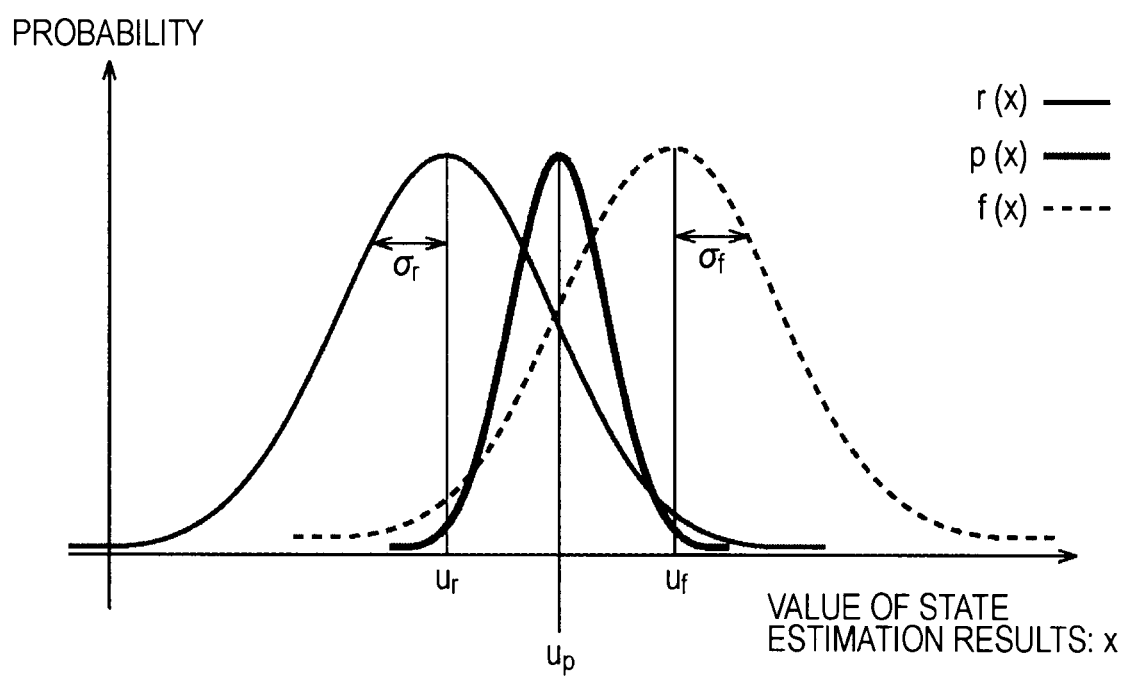
FIG. 21 illustrates a basic concept of a filtering process of a parameter generator.

FIG. 21 illustrates three types of normal distribution. In FIG. 21, the abscissa represents a value of state estimation result, and the ordinate represents probability.

A normal distribution curve f(x) is an error distribution of values of past state estimation results centered on a state estimation result value $u_f$ as a target of the filtering process. A normal distribution curve r(x) is a likelihood distribution of a predictive output value $u_r$ centered on the predictive output value $u_r$. The predictive output value $u_r$ of the filtering process with a state estimation result value $u_f$ as a process target is predicted from the filtering process result heretofore obtained. The normal distribution curve f(x) and the normal distribution curve r(x) are expressed using a standard deviation $\sigma_f$ of the normal distribution curve f(x) and a standard deviation $\sigma_r$ of the normal distribution curve r(x) in the following equations (4):

$$r(x) = N(u_r, \sigma_r) = \frac{1}{\sqrt{2\pi}\,\sigma_r} \exp\left\{-\frac{(x-u_r)^2}{2\sigma_r^2}\right\} \quad (4)$$

$$f(x) = N(u_f, \sigma_f) = \frac{1}{\sqrt{2\pi}\,\sigma_f} \exp\left\{-\frac{(x-u_f)^2}{2\sigma_f^2}\right\}$$

A normal distribution curve p(x) is a normal distribution resulting from multiplying the normal distribution curve f(x) and the normal distribution curve r(x) and is expressed in the following equation (5):

$$p(x) = r(x)\cdot f(x) = \frac{1}{2\pi\sigma_f\sigma_r}\exp\left\{-\frac{(x-u_f)^2}{2\sigma_f^2}-\frac{(x-u_r)^2}{2\sigma_r^2}\right\} \quad (5)$$

If equation (5) is re-organized with a state estimation result value x as a variable, the normal distribution curve p(x) is expressed by the following equation (6):

$$p(x) = K_p \cdot \exp\left\{-\frac{(x-u_p)^2}{2\sigma_p^2}\right\} \quad (6)$$

In equation (6), $u_p$ is an expected value of the normal distribution curve p(x) and is an output value outputted in the filtering process, $\sigma_p$ is a standard deviation of the normal distribution curve p(x), and a constant $K_o$ is a normalized term (constant) of the normal distribution curve p(x). The output $u_p$ and the standard deviation $\sigma_p$ are expressed by the following equations (7):

$$u_p = \frac{u_r \cdot \sigma_f^2 + u_f \cdot \sigma_r^2}{\sigma_f^2 + \sigma_r^2} = \frac{\sigma_f^2}{\sigma_f^2 + \sigma_r^2} u_r + \frac{\sigma_r^2}{\sigma_f^2 + \sigma_r^2} u_f \quad (7)$$

$$\frac{1}{\sigma_p^2} = \frac{\sigma_f^2 + \sigma_r^2}{\sigma_f^2 \sigma_r^2} = \frac{1}{\sigma_r^2} + \frac{1}{\sigma_f^2}$$

In equations (7), the output value $u_p$ of the filtering process is represented by a ratio of a variance ($=\sigma_f^2$) of an error distribution represented by the normal distribution curve f(x) to a variance ($=\sigma_r^2$) of the likelihood represented the normal distribution curve r(x).

A reliability of the state estimation result value $u_f$ as a process target of the filtering process is evaluated, and the evaluated reliability is reflected in the variance $\sigma_f^2$ of the error distribution and the variance $\sigma_r^2$ of the likelihood distribution. The filtering process that outputs adaptively a value in a relationship between the state estimation result value $u_f$ and a predictive output value $u_r$ in response to the reliability of the state estimation result value $u_f$ is thus performed.

The ratio of the variance $\sigma_f^2$ of the error distribution to the variance $\sigma_r^2$ of the likelihood distribution is a relative value. It is sufficient if the evaluated reliability of the state estimation result value $u_f$ is reflected in one of the variance $\sigma_f^2$ and the variance $\sigma_r^2$. In accordance with the present embodiment, the variance $\sigma_f^2$ of the error distribution is varied in response to the reliability of the state estimation result value $u_f$ as a filtering process target while the variance $\sigma_r^2$ of the likelihood distribution is fixed (a predetermined fixed value is used). Such a process is described below.

Figure 22A:
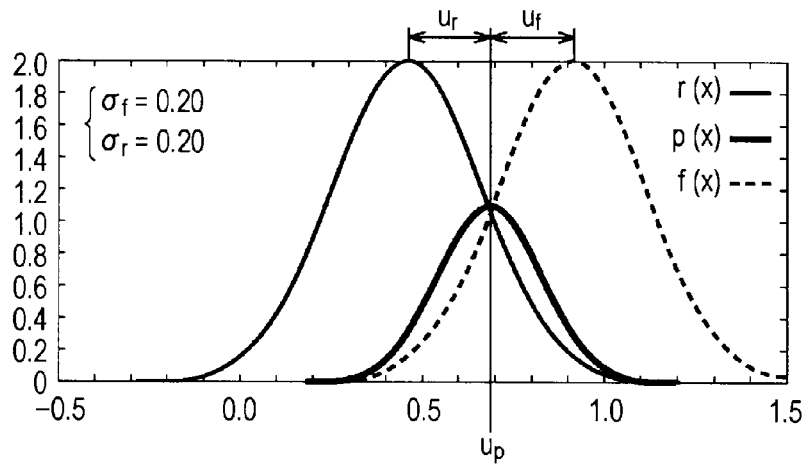
FIGS. 22A-22C illustrate a relationship between a change in variance $\sigma_f^2$ of an error distribution and a change in an output value $u_p$ of a filter.
Figure 22B:
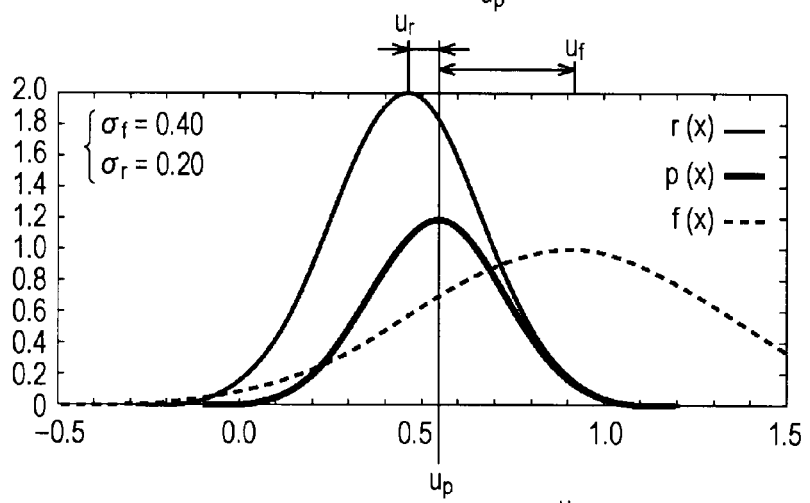
Figure 22C:
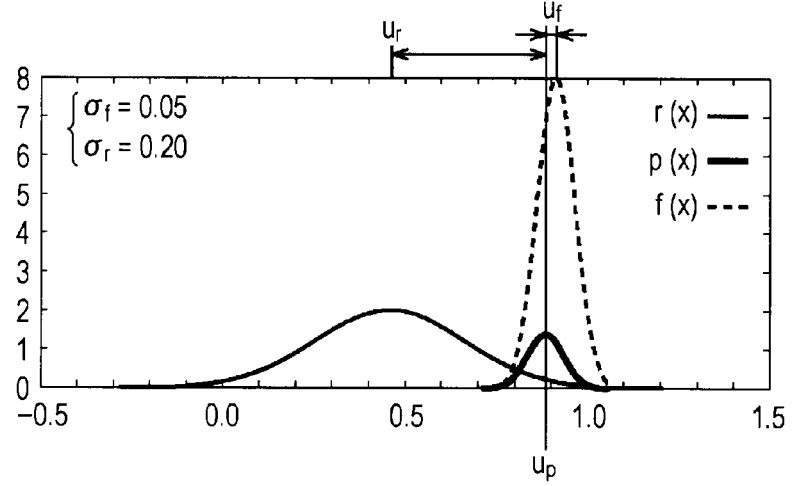

FIGS. 22A-22C illustrate a relationship between a change in the variance $\sigma_f^2$ of the error distribution and a change in the output value $u_p$ of the filter.

FIGS. 22A-22C illustrate the normal distribution curve f(x), the normal distribution curve r(x), and the normal distribution curve p(x) obtained when the variance $\sigma_f^2$ of the error distribution is varied ($\sigma_f$=0.20, 0.40, and 0.05) with the variance $\sigma_r^2$ of the likelihood distribution fixed ($\sigma_r$=0.20). Referring to FIGS. 22A-22C, the output value $u_p$ becomes closer to the predictive output value $u_r$ if the variance $\sigma_f^2$ of the error distribution is larger, and the output value $u_p$ becomes closer to the state estimation result value $u_f$ if the variance $\sigma_f^2$ of the error distribution is smaller. By varying the variance $\sigma_f^2$ of the error distribution in this way, the output value $u_p$ of the filter can be adaptively varied.

A method of determining the variance $\sigma_f^2$ of the error distribution is described below.

The error distribution represented by the normal distribution curve f(x) serves as an indicator representing the reliability of the state estimation result value $u_f$ as a filtering process target. The output value $u_p$ is determined by the ratio of the variance $\sigma_f^2$ of the error distribution to the variance $\sigma_r^2$ of the likelihood distribution. In view of this operation, the filtering process becomes effective by setting a large value to be the variance $\sigma_f^2$ of the error distribution if the reliability of the state estimation result value $u_f$ is low, and setting a small value to be the variance $\sigma_f^2$ of the error distribution if the reliability of the state estimation result value $u_f$ is high. An effective filtering process thus results.

The reliability of the state estimation result value $u_f$ is evaluated in order to vary the variance $\sigma_f^2$ of the error distribution in response to the reliability of the state estimation result value $u_f$. Available to evaluate the reliability of the state estimation result value $u_f$ is a technique of using sample variations with a history of past output values from the filtering process being used as samples. In such a technique, a value having a small variation for a long period of time, namely, remaining constant for a long period of time is used.

An acceleration component (quadratic differential) of the state estimation result value may be used as a value that has a property of remaining constant for a long period of time. It is contemplated that a velocity component is used as a value having a property of remaining constant for a long period of time if a localized period of time is considered. The velocity component of the state estimation result value tends to gradually vary for a long period of time.

Figure 23A:
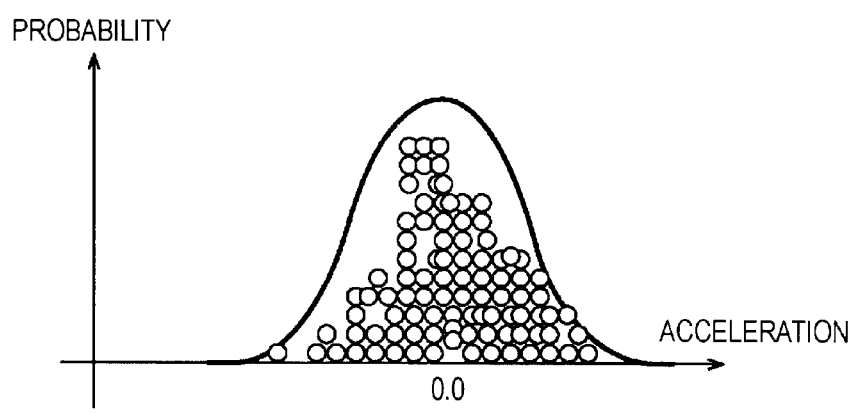
FIGS. 23A and 23B illustrate a distribution of an acceleration component of a state estimation result value and a distribution of a velocity component of the state estimation result value.
Figure 23B:
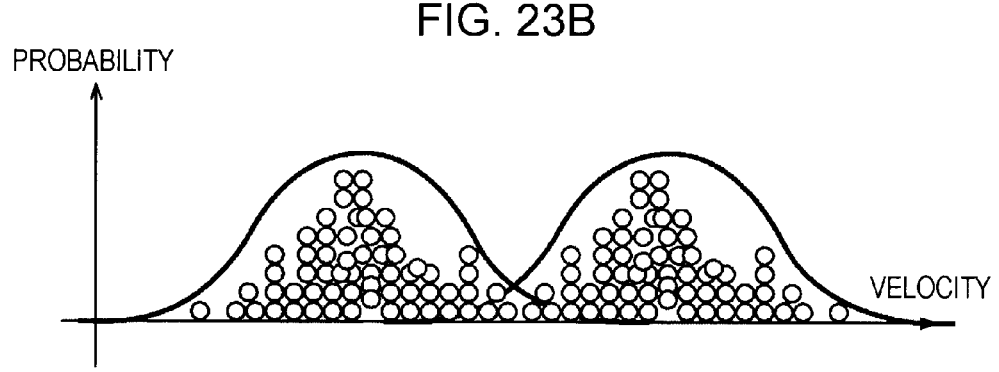

A distribution of the acceleration components of the state estimation result values is compared with a distribution of the velocity components of the state estimation result values with reference to FIGS. 23A and 23B. Referring to FIGS. 23A and 23B, calculated acceleration components and velocity components are represented by blank circles, and the distributions thereof are represented by curves.

Referring to FIG. 23A, the acceleration components of the state estimation result values have a distribution of variations symmetrical with respect to 0.0, and tend to have a constant value for a long period of time. Referring to FIG. 23B, the velocity components of the state estimation result values have no such distribution of variations as the one symmetrical with respect to a particular value, and have no such a property as the one remaining constant for a long period of time. The use of the acceleration components of the state estimation result values for the evaluation of the reliability provides stable results.

The acceleration component acc(t) of the state estimation result value $u_f(t)$ at time t is calculated from an output value $u_p(t-1)$ at time t−1 and an output value $u_p(t-2)$ at time t−2 in accordance with the following equation (8):

$$acc(t) = (u_f(t) + u_p(t-2)) - (2.0 \times u_p(t-1)) \quad (8)$$

A variance var(t) of the acceleration component acc(t) of the state estimation result value $u_f(t)$ at time t is calculated from the acceleration component acc(t) up to time t−1 in accordance with the following equation (9):

$$\mathrm{var}(t) = \frac{1}{t-1}\sum_{i=1}^{t-1} acc(i)^2 - \left(\frac{1}{t-1}\sum_{i=1}^{t-1} acc(i)\right)^2 \quad (9)$$

From equations (8) and (9), the variance var(t) of the acceleration component of the state estimation result value is updated with the past output value of the filter.

Mahalanobis' distance is calculated based on the variance var(t) of the acceleration component of the state estimation result value updated with the past output value of the filter and the acceleration component acc(t) of the state estimation result value at time t, and the squared Mahalanobis' distance is set to be the variance $\sigma_f^2$ of the error distribution at time t.

More specifically, the variance $\sigma_f^2$ of the error distribution at time t is calculated in accordance with the following equations (10):

$$\sigma_f^2(t) = \frac{acc(t)}{\text{var}(t)} \qquad (10)$$

$$\sigma_r^2 = \text{Fixed value}$$

The variance $\sigma_f^2(t)$ of the error distribution used in the filtering process of the state estimation result value $u_f(t)$ as a process target at time t is calculated in this way. As previously discussed, the ratio of the variance $\sigma_f^2$ of the error distribution to the variance $\sigma_r^2$ of the likelihood distribution is a relative value, and a fixed value is used for the variance $\sigma_r^2$.

The predictive output value $u_r$ is calculated to determine the output value $u_p$ of the filter as discussed with reference to equations (7). A method of calculating the predictive output value $u_r$ is described below.

The predictive output value $u_r$ of the filtering process with a state estimation result value $u_f$ as a process target is predicted from the filtering process results heretofore obtained. To predict the output value $U_r$, a motion model is assumed. In accordance with the present embodiment, a constant velocity motion model is adopted. The constant velocity motion model is based on the property that the variation of the face is typically continuous. Depending on the state estimation result value $u_f$, i.e., depending on the type of parameters calculated by the parameter generator 17, a constant acceleration motion (meaning a change in velocity of the face orientation) may be used. The motion model for determining the state estimation result value $u_f$ may be any of these models.

In the prediction of the constant velocity model, a current output value is predicted based on an immediately preceding output value and an immediately preceding acceleration value in the filtering process. The predictive output value $u_r$ at time t is calculated in accordance with the following equation (11):

$$U_r(t) = u_p(t-1) + (U_p(t-1) - u_p(t-2)) \qquad (11)$$

From equation (11), past output values $u_p(t-1)$ at time t−1 and $u_p(t-2)$ at time t−2 of the filter are used to calculate the predictive output value $u_r(t)$ at time t.

The values thus determined are the variance $(\sigma_f^2)$ of the error distribution represented by the normal distribution curve f(x), the variance $(\sigma_r^2)$ of the likelihood represented by the normal distribution curve r(x), and the predictive output value $u_r$ predicted from the results of the filtering process obtained heretofore. By calculating equations (7), the expected value of the normal distribution curve p(x), i.e., the output value $u_p$ of the filter, is calculated.

Figure 24:
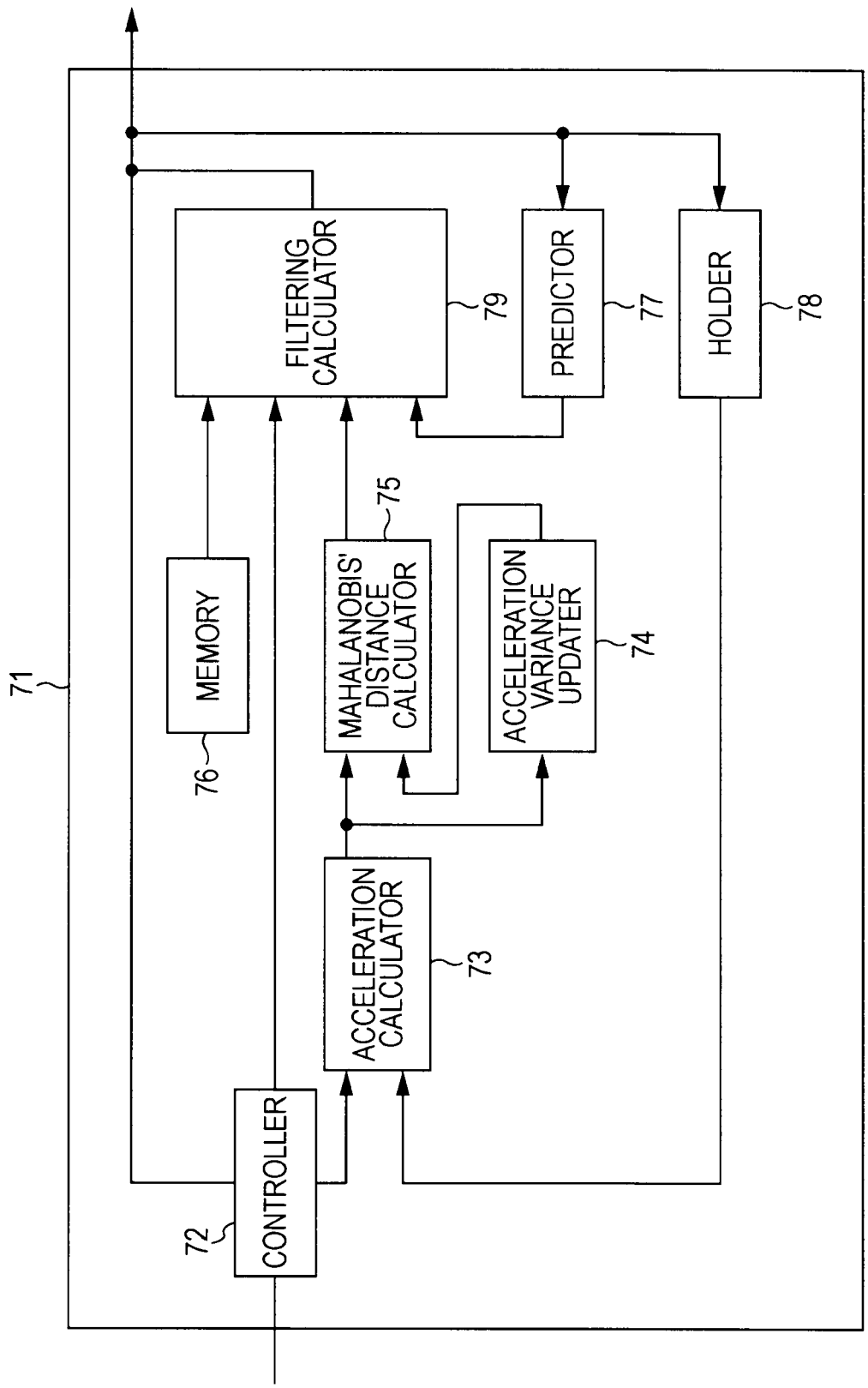
FIG. 24 is a block diagram of the filtering processor.

FIG. 24 is a block diagram of a filtering processor 71.

The filtering processor 71 illustrated in FIG. 24 includes a controller 72, an acceleration calculator 73, an acceleration variance updater 74, a Mahalanobis's distance calculator 75, a memory 76, a predictor 77, a holder 78, and a filtering calculator 79. The filtering processor 71 may be used in place of the filtering processor 42 of FIG. 1.

The controller 72 receives the parameter calculated by each parameter calculator in the parameter generator 17, i.e., the state estimation result value $u_f$. The controller 72 controls each element in the filtering processor 71, for example, controls the supplying of the state estimation result value $u_f$ to the acceleration calculator 73 and the filtering calculator 79. The filtering process of the state estimation result value $u_f(t)$ at time t is described below.

When the acceleration calculator 73 receives the state estimation result value $u_f(t)$ from the controller 72, the acceleration calculator 73 also receives the output value $u_p(t-1)$ at time t−1 and the output value $u_p(t-2)$ at time t−2. By calculating equation (8), the acceleration calculator 73 calculates the acceleration component acc(t) of the state estimation result value $u_f(t)$, and then supplies the calculated acceleration component acc(t) to the acceleration variance updater 74 and the Mahalanobis's distance calculator 75.

Upon receiving the acceleration component acc(t) of the state estimation result value $u_f(t)$ from the acceleration calculator 73, the acceleration variance updater 74 calculates equation (9). The acceleration variance updater 74 thus calculates the variance var(t) of the acceleration component of the state estimation result value and then supplies the calculated variance var(t) to the Mahalanobis's distance calculator 75.

On the basis of the acceleration component acc(t) from the acceleration calculator 73, and the variance var(t) of the acceleration component from the acceleration variance updater 74, the Mahalanobis's distance calculator 75 calculates the variance $\sigma_f^2$ of the error distribution (in accordance with equations (10)) and then supplies the calculated variance $\sigma_f^2$ to the filtering calculator 79.

The memory 76 stores the variance $\sigma_r^2$ of the likelihood distribution as the fixed value, and the filtering calculator 79 receives from the memory 76 the variance $\sigma_r^2$ of the likelihood distribution.

The predictor 77 receives the output value $u_p$ from the filtering processor 71. On the basis of the output value $u_p(t-1)$ at time t−1 and the output value $u_p(t-2)$ at time t−2, the predictor 77 calculates equation (11), thereby calculating the predictive output value $u_r(t)$. The predictor 77 then supplies the predictive output value $u_r(t)$ to the filtering processor 71.

The holder 78 receives the output value $u_p$ from the filtering processor 71. The holder 78 holds the output value $u_p$, and supplies the output value $u_p(t-1)$ and the output value $u_p(t-2)$ to the acceleration calculator 73.

The filtering calculator 79 calculates equations (7) based on the state estimation result value $u_f(t)$ supplied by the controller 72, the variance $\sigma_f^2(t)$ of the error distribution supplied by the Mahalanobis's distance calculator 75, the variance $\sigma_r^2(t)$ of the likelihood distribution read from the memory 76, and the predictive output value $u_r(t)$ supplied by the predictor 77. The filtering calculator 79 thus determines and outputs the output value $u_p(t)$.

The filtering processor 71 can evaluate the reliability of the state estimation result value $u_f$ only after a certain number of acceleration components acc(sample) are stored. After a predetermined number of acceleration components acc are stored, the controller 72 performs the control process such that the filtering calculator 79 outputs calculation results.

Figure 25:
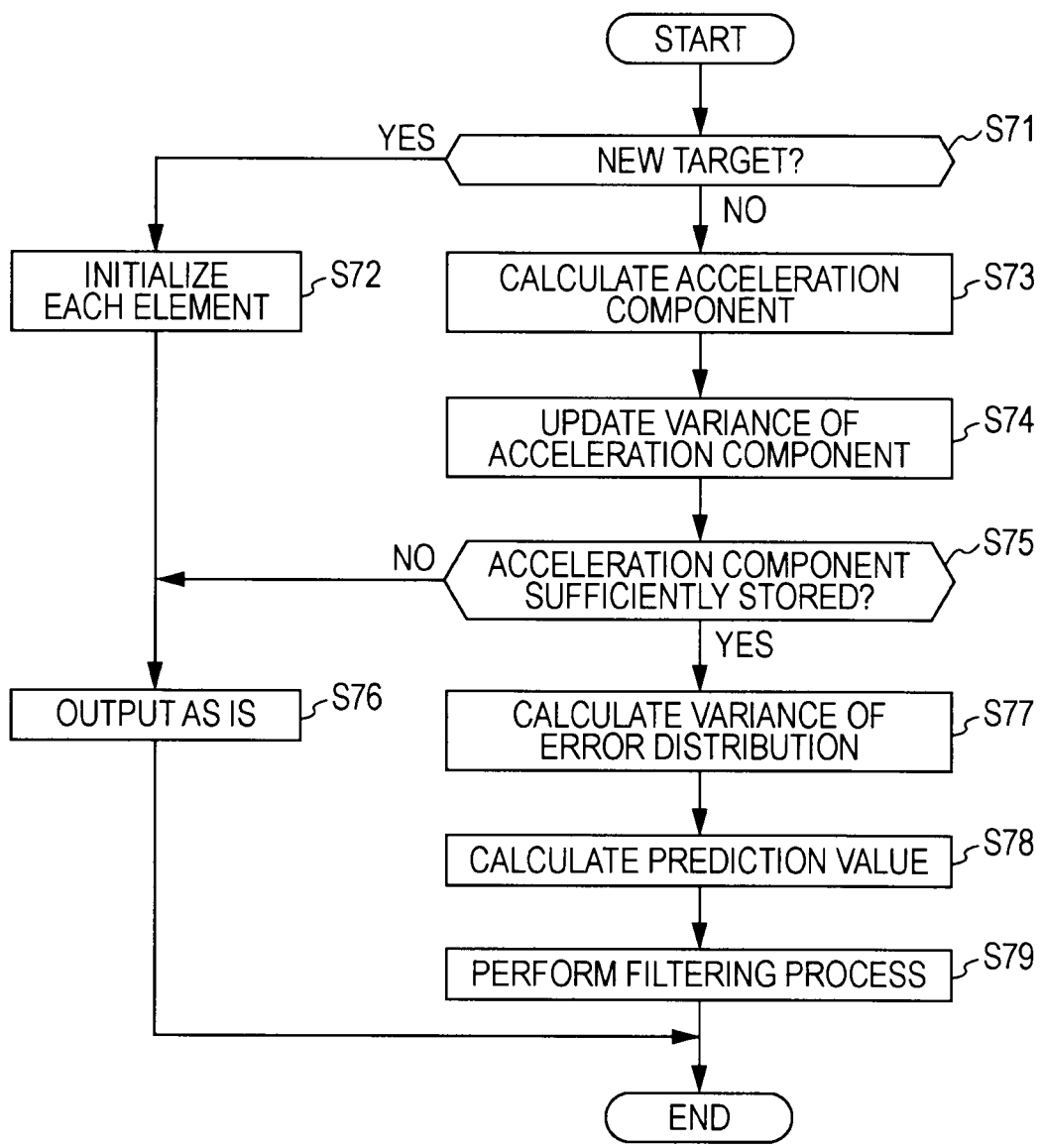
FIG. 25 is a flowchart of a filtering process of the filtering processor.

The filtering process of the filtering processor 71 is described below with reference to a flowchart of FIG. 25. The filtering process of the filtering processor 71 is executed in step S22 of FIG. 14. In step S22 of FIG. 14, the filtering process starts when the parameter, i.e., the state estimation result value $u_f(t)$ is output from each parameter calculator in the parameter generator 17 to the filtering processor 71.

In step S71, the controller 72 determines whether the supplied state estimation result value $u_f(t)$ is a new process target of the filtering process.

The image processing apparatus 11 processes the image on a per user face. If the state estimation result value $u_f(t)$ is mapped to the face on which the filtering process is in progress, the controller 72 determines that the user face is not a new process target. If the state estimation result value $u_f(t)$ is not mapped to the face on which the filtering process is in progress, i.e., in the case of the state estimation result value $u_f(t)$ calculated for the first time subsequent to the estimation of the face state (in this case, t=0), the controller 72 determines that the supplied state estimation result value $u_f(t)$ is a new process target of the filtering process.

If the controller 72 determines in step S71 that the supplied state estimation result value $u_f(t)$ is a new process target of the filtering process, processing proceeds to step S72. The controller 72 initializes each element in the filtering processor 71. For example, the controller 72 sets zeroes as initial values to internal variables (the variance var, the predictive output value $u_r$, and the output value $u_p$) used by the acceleration variance updater 74, the predictor 77, and the filtering calculator 79.

If the controller 72 determines in step S71 that the supplied state estimation result value $u_f(t)$ is not a new process target of the filtering process, processing proceeds to step S73. The controller 72 supplies the state estimation result value $u_f(t)$ to the acceleration calculator 73. The acceleration calculator 73 also receives from the holder 78 the output value $u_p(t-1)$ at time t−1 and the output value $u_p(t-2)$ at time t−2. The acceleration calculator 73 calculates equation (8) based on the state estimation result value $u_f(t)$, the output value $u_p(t-1)$, and the output value $u_p(t-2)$. The acceleration calculator 73 thus determines the acceleration component acc(t) of the state estimation result value $u_f(t)$ and supplies the acceleration component acc(t) to the acceleration variance updater 74.

Processing proceeds from step S73 to step S74. The acceleration variance updater 74 calculates equation (9) based on the acceleration component acc(t) supplied by the acceleration calculator 73 in step S73. The acceleration variance updater 74 thus determines the variance var(t) of the acceleration component of the state estimation result value. Processing proceeds to step S75.

In step S75, the controller 72 determines whether a sufficient number of acceleration components acc(t) are stored. In other words, the controller 72 determines whether the variance var(t) calculated in step S74 is determined from the number of state estimation result values $u_f$ large enough to evaluate the reliability of the state estimation result value $u_f$. More specifically, the variance var(t) determined from a certain number of acceleration components acc(t) is used to evaluate the reliability of the state estimation result value $u_f$. The controller 72 sets the certain number as a threshold value (for example, 20). If the number of acceleration components acc(t) the acceleration variance updater 74 has used to calculate the variance var(t) is equal to or larger than the threshold value, the controller 72 determines that a sufficient number of acceleration components acc(t) are stored. On the other hand, if the number of acceleration components acc(t) the acceleration variance updater 74 has used to calculate the variance var(t) is smaller than the threshold value, the controller 72 determines that a sufficient number of acceleration components acc(t) are not stored.

Since the output value $u_p(t-2)$ supplied by the holder 78 at time t−2 in step S73 is used, the process in steps S73-S75 is performed on an image two frames later than when it was determined that the supplied state estimation result value $u_f(t)$ was a new process target (when the output value $u_p(t-2)$ was output). Step S76 is performed with steps S73 and S75 skipped until two frames have been output since it was determined in step S71 that the state estimation result value $u_f(t)$ was the new target.

Subsequent to step S72, or the controller 72 determines in step S75 that no sufficient number of acceleration components acc(t) are stored, processing proceeds to step S76. In step S76, the controller 72 outputs the supplied state estimation result value $u_f(t)$ as the output value $u_p(t)$ to the predictor 77 and the holder 78. Since the reliability of the state estimation result value $u_f(t)$ is not accurately evaluated, the filtering processor 71 does not calculate the output value $u_p$. Subsequent to step S76, the filtering process thus ends. A next frame is then processed.

If the controller 72 determines in step S75 that a sufficient number of acceleration components acc(t) are stored, processing proceeds to step S77. In step S77, the controller 72 controls the acceleration calculator 73 and the acceleration variance updater 74 such that the acceleration component acc(t) calculated in step S73 and the variance var(t) calculated in step S74 are output to the Mahalanobis's distance calculator 75. The Mahalanobis's distance calculator 75 calculates the variance $\sigma_f^2$ of the error distribution from the acceleration component acc(t) and the variance var(t), and supplies the variance $\sigma_f^2$ of the error distribution to the filtering calculator 79. Processing proceeds to step S78.

In step S78, the predictor 77 calculates equation (11) based on the output value $u_p(t-1)$ at time t−1 and the output value $u_p(t-2)$ at time t−2, thereby determining the predictive output value $u_r$. The predictor 77 then supplies the predictive output value $u_r$ to the filtering processor 71.

Processing proceeds from step S78 to step S79. The controller 72 supplies the state estimation result value $u_f(t)$ to the filtering calculator 79. The filtering calculator 79 reads the variance $\sigma_r^2$ of the likelihood distribution from the memory 76. The filtering calculator 79 calculates equations (7), based on the state estimation result value $u_f(t)$, the variance $\sigma_r^2$ of the likelihood distribution, the variance $\sigma_f^2$ of the error distribution supplied in step S77, and the predictive output value $u_r$ supplied in step S78. The filtering calculator 79 thus determines and outputs the output value $u_p(t)$. The filtering process thus ends.

Even if an error occurs in the calculation of each parameter calculator in the parameter generator 17 and the parameter output from the parameter calculator (the state estimation result value) suffers from a sharp and large variation, the filtering processor 71 reduces the variation. Since such a fluctuating parameter has a low reliability (the variance $\sigma_f^2$), the filtering processor 71 outputs a predictive output value. Variations caused by the calculation error are thus reduced. A stable and robust filtering process is thus performed. Such an arrangement is also free from a delay that could take place if a filtering processor constructed of a multi-stage filter was used.

The image generator 18 generates the avatar using the parameter filtering processed by the filtering processor 71. The image generator 18 thus generates the avatar having a high follow-up property responsive to a change in the state of the face of the user, and moving naturally and smoothly in a manner free from vibrations caused by a calculation error of the parameters (irregular variations of the parameters).

The above-described filtering process is performed on a single parameter. The parameters are integrally used by using a state vector and a covariance matrix on a plurality of parameters calculated by the parameter calculators in the parameter generator 17. The use of the state vector results in an interactive effect between states (parameters), and a more robust filtering process is thus performed.

The series of process steps described above may be performed using hardware or software. If the process steps are performed using software, a program forming the software is installed on a computer from a program recording medium. The computers include a computer in a dedicated hardware system, and a general-purpose personal computer that performs a variety of functions with a variety of programs installed thereon.

FIG. 26 is a block diagram illustrating a hardware structure of a computer that performs the above-described process steps.

In the computer, a CPU 101, a read-only memory (ROM) 102, and a random-access memory (RAM) 103 are interconnected to each other via a bus 104.

The bus 104 is connected to an input-output interface 105. Also connected to the input-output interface 105 are an input unit 106, an output unit 107, a storage unit 108, a communication unit 109, and a drive 110. The input unit 106 includes a keyboard, a mouse, a microphone, etc. The output unit 107 includes a display, a loudspeaker, etc. The storage unit 108 includes a hard disk, a non-volatile memory, etc. The communication unit 109 includes a network interface, etc. The drive 110 drives a removable medium 111, such as a magnetic disc, an optical disc, or a semiconductor memory.

The CPU 101 in the computer thus constructed performs the above-described series of process steps by loading a program from the storage unit 108 onto the RAM 104 via the input-output interface 105 and the bus 104, and then executing the program.

The program to be executed by the CPU 101 is supplied on the removable medium 111 as a package medium, such as a magnetic disk (flexible disk), an optical disk (compact-disc read-only memory (CD-ROM), a digital versatile disc (DVD)), magneto-optical disc, or a semiconductor memory. The program may also be supplied using wired or wireless transmission media, such as a local-area network (LAN), the Internet, or a digital broadcasting satellite.

The program may be installed onto the storage unit 108 in the computer through the input-output interface 105 by loading the removable medium 111 onto the drive 110. The program may be received by the communication unit 109 via wired or wireless transmission media, and then installed onto the storage unit 108. The program may also be pre-installed onto the ROM 102 or the storage unit 108.

The program may be executed by the computer with the process steps in the time-series order previously described or with several process steps in parallel or at an appropriate timing at which a call is made. The program may be executed by a single CPU or a plurality of CPUs.

The present application contains subject matter related to that disclosed in Japanese Priority Patent Application JP 2009-201028 filed in the Japan Patent Office on Aug. 31, 2009, and Japanese Priority Patent Application JP 2009-284807 filed in the Japan Patent Office on Dec. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a face detector configured to detect a face region from an image including a face of a user, the face detector outputting first face orientation information indicating an orientation of the face of the user;
   a part detector configured to detect a positional layout of a part of the face included in the face region detected by the face detector, the part detector outputting second face orientation information indicating an orientation of the face of the user in response to the positional layout of the part;
   a determiner configured to determine an attribute of the face on the basis of the positional layout of the part detected by the part detector and calculating a score indicating attribute determination results;
   a model selector configured to select, on the basis of the score calculated by the determiner, a model that is to be displayed in place of the face of the user in the image;
   an image generator configured to generate an image of a face of the model selected by the model selector and to synthesize the image of the face of the model over the face of the user within the face region to create a second image; and
   a face orientation parameter selector configured to select a parameter controlling an orientation of the face of the model generated by the image generator, on the basis of time variations of the first face orientation information and time variations of the second face orientation information, if the orientation of the face of the user in the face region detected by the face detector is in the vicinity of a border of a detection range of the face detector.

2. The image processing apparatus according to claim 1, wherein the attribute of the face determined by the determiner comprises age or sex.

3. The image processing apparatus according to claim 1, further comprising:
   a mouth shape detector configured to detect a plurality of points identifying a mouth shape of the face of the user;
   a vowel determiner configured to determine the mouth shape of the user from the plurality of points detected by the mouth shape detector, and outputting a vowel parameter indicating a ratio of each vowel if the mouth shape is represented by a predetermined number of vowels; and
   a mouth shape synthesizer configured to synthesize models by weighting the models with the vowel parameters responsive to the models, the models serving as bases of the mouth shapes of the vowels of the predetermined number.

4. The image processing apparatus according to claim 1, further comprising:
   a parameter output unit configured to calculate a parameter estimating a state of the face of the user within the face region detected by the face detector; and
   a filter processing unit configured to perform a filtering operation on the parameter output from the parameter output unit, wherein the filter processing unit includes a reliability calculator configured to calculate a reliability of the parameter output as a process target by the parameter output, a predictor configured to determine, on the basis of a past output value of the filter processing unit, a predictive output value as a predictive value of the output value output if the filtering operation is performed on the parameter as the process target, and a filter calculator configured to calculate an output value output as a result of the filtering operation, by weighted summing the parameter as the process target, and the predictive output value determined by the predictor in accordance with the reliability calculated by the reliability calculator.

5. An image processing apparatus comprising:
   a face detector configured to detect a face region from an image including a face of a user;
   a part detector configured to detect a positional layout of a part of the face included in the face region detected by the face detector;

a determiner configured to determine an attribute of the face on the basis of the positional layout of the part detected by the part detector and calculating a score indicating attribute determination results;

a model selector configured to select, on the basis of the score calculated by the determiner, a model that is to be displayed in place of the face of the user in the image;

an image generator configured to generate an image of a face of the model selected by the model selector and to synthesize the image of the face of the model over the face of the user within the face region to create a second image;

a parameter output unit configured to calculate a parameter estimating a state of the face of the user within the face region detected by the face detector; and a filter processing unit configured to perform a filtering operation on the parameter output from the parameter output unit, wherein the filter processing unit includes a reliability calculator configured to calculate a reliability of the parameter output as a process target by the parameter output, a predictor configured to determine, on the basis of a past output value of the filter processing unit, a predictive output value as a predictive value of the output value output if the filtering operation is performed on the parameter as the process target, and a filter calculator configured to calculate an output value output as a result of the filtering operation, by weighted summing the parameter as the process target, and the predictive output value determined by the predictor in accordance with the reliability calculated by the reliability calculator, and the reliability calculator calculates the reliability based on an acceleration component of the parameter as the process target, and a variance of acceleration components of past parameters calculated prior to the parameter as the process target.

6. An image processing apparatus comprising:

a face detector configured to detect a face region from an image including a face of a user;

a part detector configured to detect a positional layout of a part of the face included in the face region detected by the face detector;

a determiner configured to determine an attribute of the face on the basis of the positional layout of the part detected by the part detector and calculating a score indicating attribute determination results;

a model selector configured to select, on the basis of the score calculated by the determiner, a model that is to be displayed in place of the face of the user in the image;

an image generator configured to generate an image of a face of the model selected by the model selector and to synthesize the image of the face of the model over the face of the user within the face region to create a second image;

a parameter output unit configured to calculate a parameter estimating a state of the face of the user within the face region detected by the face detector; and a filter processing unit configured to perform a filtering operation on the parameter output from the parameter output unit, wherein the filter processing unit includes a reliability calculator configured to calculate a reliability of the parameter output as a process target by the parameter output, a predictor configured to determine, on the basis of a past output value of the filter processing unit, a predictive output value as a predictive value of the output value output if the filtering operation is performed on the parameter as the process target, and a filter calculator configured to calculate an output value output as a result of the filtering operation, by weighted summing the parameter as the process target, and the predictive output value determined by the predictor in accordance with the reliability calculated by the reliability calculator, and the parameter output unit outputs a plurality of parameters respectively estimating a plurality of states of the face of the user, and wherein the filter processing unit performs the filtering operation using integrally the plurality of parameters output from the parameter output unit.

7. An image processing method comprising:

detecting a face region from an image including a face of a user and outputting first face orientation information indicating an orientation of the face of the user;

detecting a positional layout of a part of the face included in the face region and outputting second face orientation information indicating an orientation of the face of the user in response to the positional layout of the part;

determining an attribute of the face on the basis of the positional layout of the part and calculating a score indicating attribute determination results;

selecting, on the basis of the score, a model that is to be displayed in place of the face of the user in the image;

generating, using a processor, an image of a face of the selected model and synthesizing the image of the face of the model over the face of the user within the face region to create a second image; and selecting a parameter controlling an orientation of the face of the model, on the basis of time variations of the first face orientation information and time variations of the second face orientation information, if the orientation of the face of the user in the face region is in the vicinity of a border of a detection range of the detecting the face region.

8. The image processing method according to claim 7, further comprising:

outputting a parameter estimating a state of the face of the user within the face region; and performing a filtering operation on the parameter, wherein the step of performing the filtering operation includes calculating a reliability of the parameter output as a process target, determining, on the basis of a past output value, a predictive output value as a predictive value of the output value output if the filtering operation is performed on the parameter as the process target, and calculating an output value output as a result of the filtering operation, by weighted summing the parameter as the process target, and the predictive output value in accordance with the reliability.

9. A non-transitory computer readable medium encoded with a program for causing a computer to perform an image processing process, the image processing process comprising:

detecting a face region from an image including a face of a user and at least a portion of a body of the user other than the face and outputting first face orientation information indicating an orientation of the face of the user;

detecting a positional layout of a part of the face included in the face region and outputting second face orientation information indicating an orientation of the face of the user in response to the positional layout of the part;

determining an attribute of the face on the basis of the positional layout of the part and calculating a score indicating attribute determination results;

selecting, on the basis of the score, a model that is to be displayed in place of the face of the user in the image; and generating, using a processor, an image of a face of the selected model and synthesizing the image of the face of the model over the face of the user within the face region to create a second image; and selecting a parameter controlling an orientation of the face of the model, on the basis of time variations of the first face orientation information and time variations of the second face orientation information, if the orientation of the face of the user in the face region is in the vicinity of a border of a detection range of the detecting the face region.

10. The non-transitory computer readable medium according to claim 9, wherein the method further comprises:

outputting a parameter estimating a state of the face of the user within the face region; and performing a filtering operation on the parameter, wherein the step of performing the filtering operation includes calculating a reliability of the parameter output as a process target, determining, on the basis of a past output value, a predictive output value as a predictive value of the output value output if the filtering operation is performed on the parameter as the process target, and calculating an output value output as a result of the filtering operation, by weighted summing the parameter as the process target, and the predictive output value in accordance with the reliability.

* * * * *